(12) United States Patent
Hamaguchi

(10) Patent No.: US 7,095,830 B1
(45) Date of Patent: Aug. 22, 2006

(54) COMMUNICATION APPARATUS, COMMUNICATION METHOD, AND STORAGE MEDIUM

(75) Inventor: Jun Hamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 461 days.

(21) Appl. No.: 09/604,407

(22) Filed: Jun. 27, 2000

(30) Foreign Application Priority Data

| Jul. 13, 1999 | (JP) | ................................ 11-198744 |
| Dec. 21, 1999 | (JP) | ................................ 11-362571 |
| Jun. 14, 2000 | (JP) | ............................ 2000-178221 |

(51) Int. Cl.
*H04M 11/00* (2006.01)

(52) U.S. Cl. ............................. 379/93.02; 379/100.08; 379/100.09; 379/100.13

(58) Field of Classification Search ........... 379/100.01, 379/100.05–100.06, 100.08–100.09, 100.12–100.13, 379/100.17; 358/400, 402–403, 407, 434, 358/440–445; 713/153–156, 200–202; 709/206; 370/401, 428
See application file for complete search history.

(56) References Cited

U.S. PATENT DOCUMENTS

| 5,452,099 A | * | 9/1995 | Von Meister | ................ 358/403 |
| 5,621,727 A | * | 4/1997 | Vaudreuil | .................... 370/401 |
| 5,751,813 A | * | 5/1998 | Dorenbos | .................... 713/153 |
| 5,859,967 A | * | 1/1999 | Kaufeld et al. | ............. 713/200 |
| 6,052,445 A | * | 4/2000 | Bashoura et al. | ...... 379/100.14 |
| 6,092,191 A | * | 7/2000 | Shimbo et al. | ............. 713/153 |
| 6,137,597 A | * | 10/2000 | Kanaya | ...................... 358/402 |
| 6,185,604 B1 | * | 2/2001 | Sekiguchi | .................... 709/206 |
| 6,240,445 B1 | * | 5/2001 | Kumar et al. | ............... 709/206 |
| 6,297,891 B1 | * | 10/2001 | Kara | .......................... 358/405 |
| 6,421,429 B1 | * | 7/2002 | Merritt et al. | ........... 379/93.17 |
| 6,725,276 B1 | * | 4/2004 | Hardjoni et al. | ............ 709/238 |

FOREIGN PATENT DOCUMENTS

| EP | 0 895 390 A2 | | 2/1999 |
| JP | 63151140 A | * | 6/1988 |
| WO | WO 98/11716 | | 3/1998 |

OTHER PUBLICATIONS

Patent Abstracts of Japan, vol. 1995, No. 09, Oct. 31, 1995 (JP 07 154569 published Jun. 16, 1995).

* cited by examiner

*Primary Examiner*—Melur Ramakrishnaiah
(74) *Attorney, Agent, or Firm*—Fitzpatrick, Cella, Harper & Scinto

(57) ABSTRACT

An object of this invention is to provide a communication apparatus capable of maintaining the secrecy of data received in a memory box when forwarding the data. To achieve this object, when data received in a memory box designated by a sub-address/password signal is to be forwarded, data to which a password is added by a system corresponding to a forwarding destination (an e-mail terminal or a facsimile apparatus) is forwarded.

11 Claims, 19 Drawing Sheets

FIF STRUCTURE OF SUB-ADDRESS (SUB)

FIF STRUCTURE OF SELECTIVE POLLING (SEP)

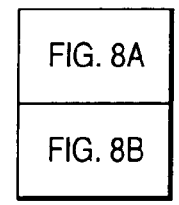
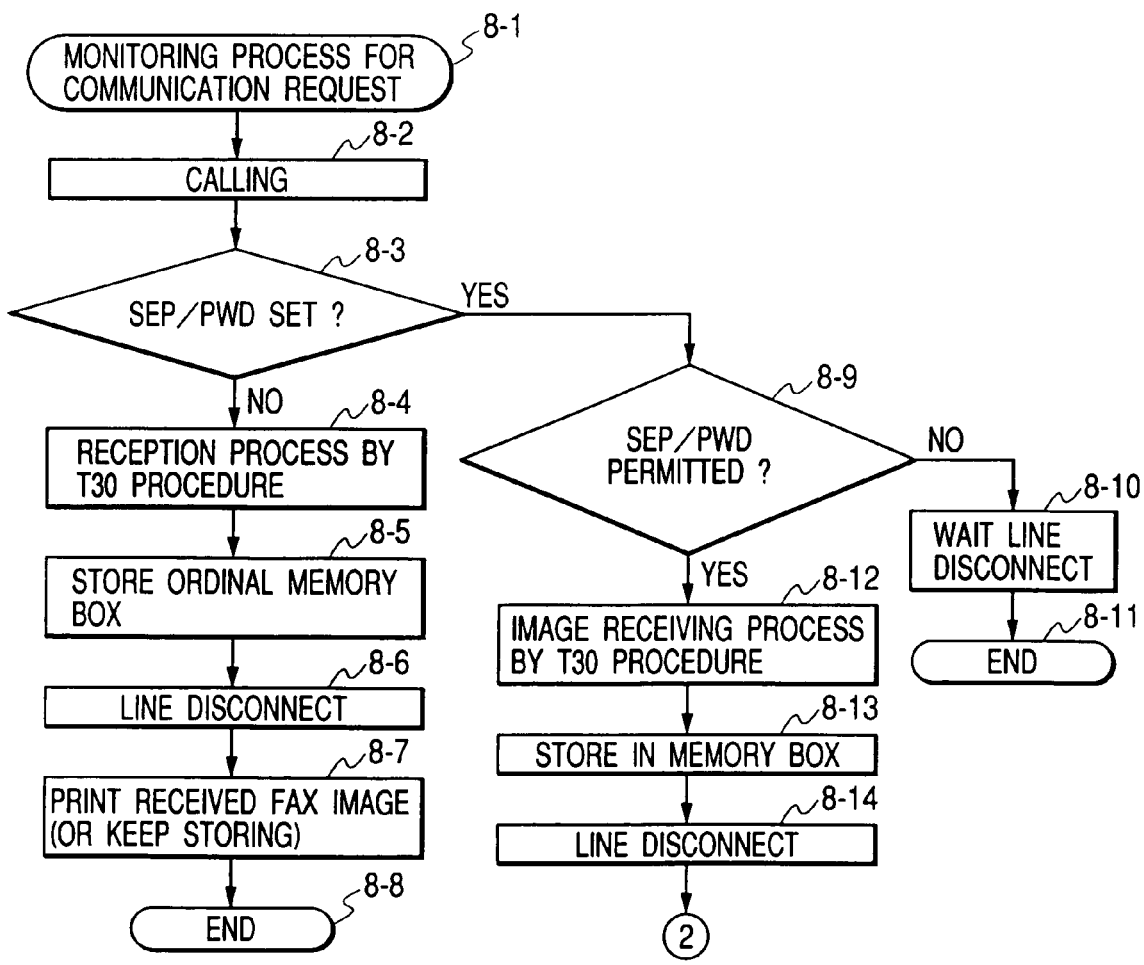

FIF STRUCTURE OF PASSWORD (PWD)

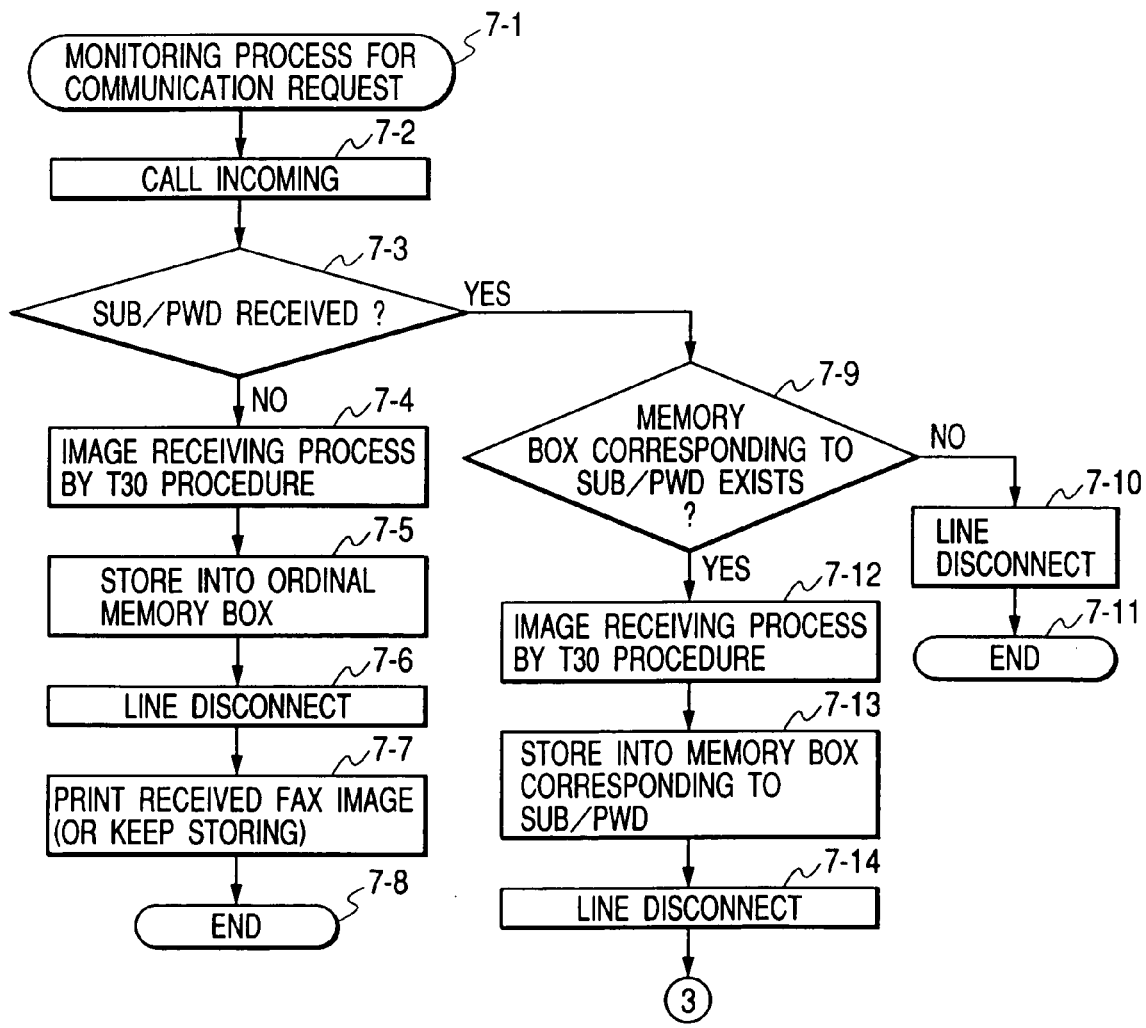

COMMUNICATION APPARATUS, COMMUNICATION METHOD, AND STORAGE MEDIUM

BACKGROUND OF THE INVENTION

1. Field of the Invention

The present invention relates to a communication apparatus and, more particularly, to a communication apparatus having a facsimile function capable of connecting to a LAN.

2. Related Background Art

A communication apparatus is conventionally known which has a facsimile function capable of connecting to a LAN in addition to an existing communication line such as a public services telephone network (PSTN). A communication apparatus of this type can output communication data, received via a public services telephone network (PSTN), onto a recording paper sheet and can also store the data in a predetermined memory (to be referred to as a memory box hereinafter) from which the stored data can be extracted from a terminal on a LAN. A document received in a memory box for which a predetermined password is set is treated as a secret document. This document is extracted by using the password set for the memory box.

Unfortunately, after being extracted data once regarded as a secret document is treated as a commonly extracted received document when it arrives at a user, losing its secrecy. To solve this problem, it is possible to impose limitations so as not to allow saving of a secret document extracted by an information processing terminal on a LAN, and to allow only reading of the document. If this is the case, however, the data of a secret document cannot be saved, and this impairs the user friendliness. Also, if documents are kept stored in a receiving apparatus, a memory box becomes full.

The present invention has been made to solve this problem, and has as its object to provide a communication apparatus capable of maintaining the secrecy of data received in a memory box when forwarding the data.

SUMMARY OF THE INVENTION

One aspect of the present invention is a communication apparatus for transmitting received data and first authentication information to a forwarding destination apparatus. The communication apparatus includes: (1) acquiring means for acquiring data and first authentication information pertaining to the data; (2) determining means for determining a type of reception function of the forwarding destination apparatus;

(3) converting means for converting the data and the first authentication information in accordance with a result of the determination by said determining means; and (4) transmitting means for transmitting the converted data and the converted first authentication information, to the forwarding destination apparatus, wherein the transmitted data can be used when second authentication information inputted to the forwarding destination apparatus coincides with the first authentication information, and wherein, if the determination by the determining means is that the forwarding destination apparatus has an email function, the converting means converts the received data into a file of a predetermined format and adds the first authentication information to the file.

Yet another aspect of the present invention is a communication method of transmitting received data and first authentication information to a forwarding destination apparatus. The communication method includes: (1) an acquisition step, of acquiring data and first authentication information pertaining to the data; (2) a determination step, of determining a type of reception function of the forwarding destination apparatus; (3)

a converting step, of converting the data and the first authentication information in accordance with a result of the determination performed in said determination step; and (4)

a transmission step, of transmitting the converted data and the converted first authentication information to the forwarding destination apparatus, wherein the transmitted data can be used when second authentication information inputted to the forwarding destination apparatus coincides with the first authentication information and wherein, if the determination result from the determination step, is that the forwarding destination apparatus has an email function, the converting step includes converting the received data into a file of a predetermined format and adding the first destination information to the file.

Still another aspect of the present invention is a computer-readable medium storing a computer program executable by a processor for transmitting received data and first authentication information to a forwarding destination apparatus. The program includes: (1) code for an acquisition step, of acquiring data and first authentication information pertaining to the data; (2) code for a determination step, of determining a type of reception function of the forwarding destination apparatus; (3) code for a conversion step, of converting the data in accordance with a result of the determination performed by said code for a determination step; and (4) code for a transmitting step, of transmitting the converted data with the added first authentication information to the forwarding destination apparatus, wherein the transmitted data can be used when second authentication information inputted to the forwarding destination apparatus coincides with the first authentication information and wherein, if the determination by the code for the determining step is that the forwarding destination apparatus has an email function, the code for the converting step converts the received data into a file of a predetermined format and adds the first authentication information to the file.

Other objects, features and advantages of the invention will become apparent from the following detailed description taken in conjunction with the accompanying drawings.

DESCRIPTION OF THE PREFERRED EMBODIMENTS

Preferred embodiments of the present invention will be described in detail below with reference to the accompanying drawings.

Figure 1:
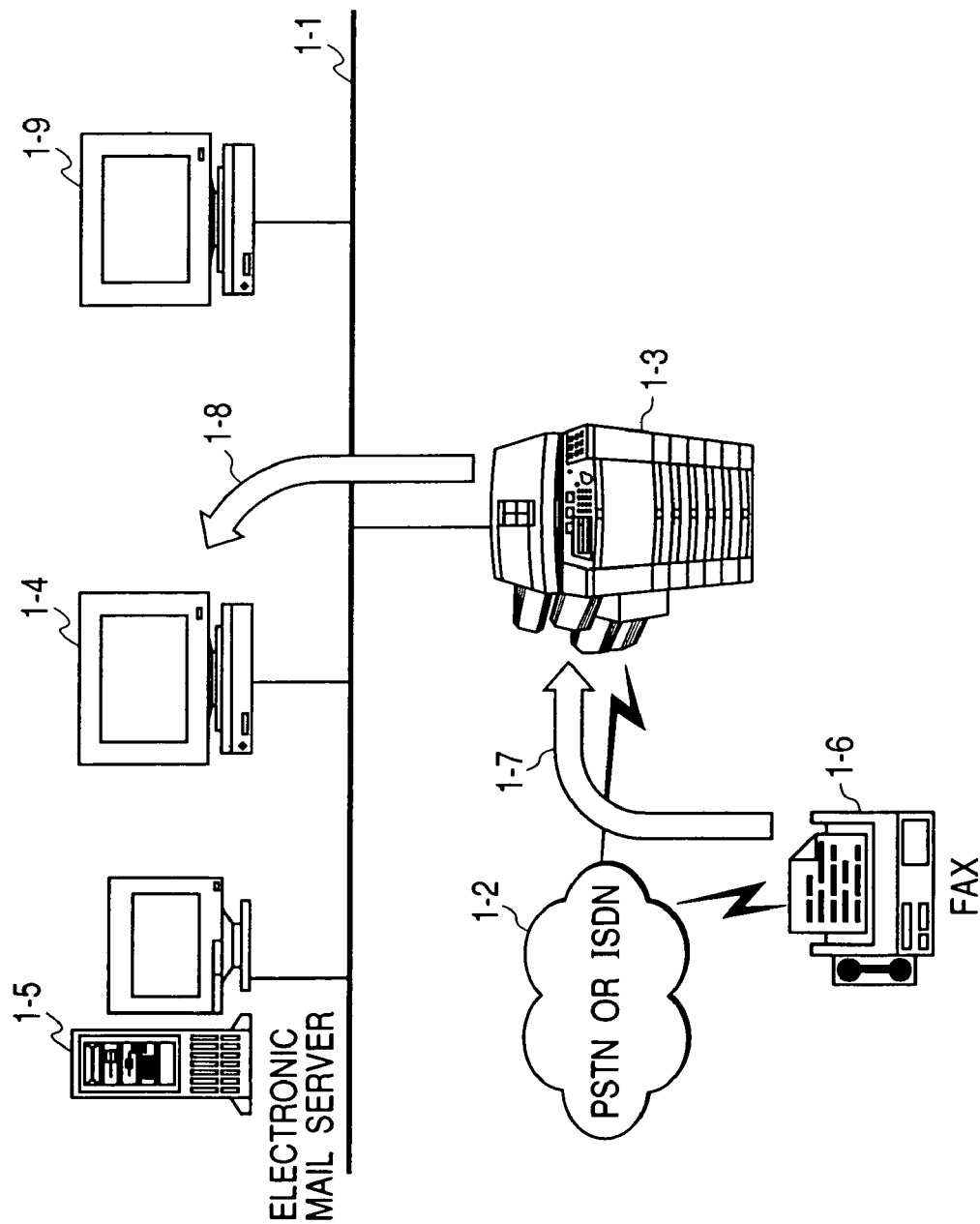
FIG. 1 is a view showing the configuration of a network system of an embodiment.

FIG. 1 is a view showing the system configuration of a communication system using a communication apparatus according to this embodiment.

Referring to FIG. 1, a communication apparatus 1-3 according to the present invention is connected to a LAN (Local Area Network) 1-1 and a public line (PSTN or ISDN) 1-2. A plurality of terminal devices (e.g., workstations or personal computers) 1-4 and 1-9 and an electronic mail server 1-5 are connected to the LAN 1-1. A facsimile apparatus 1-6 is connected to the public line 1-2. In this system configuration, the communication apparatus 1-3 receives image data in a memory box via the public line 1-2 (a route 1-7). This image data is extracted from the terminal device 1-4 or 1-9 via the LAN 1-1 (a route 1-8).

Figure 2:
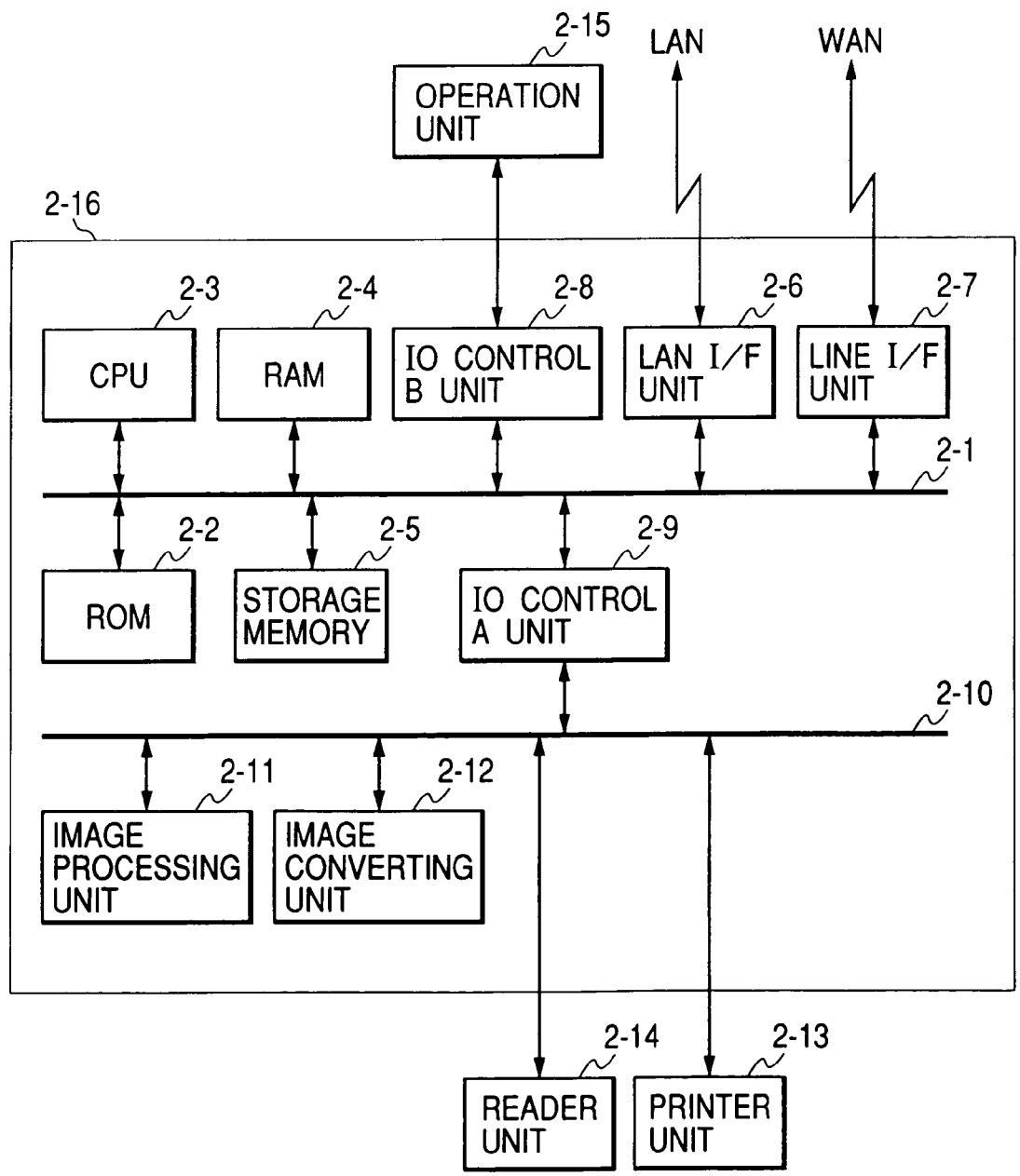
FIG. 2 is a block diagram showing the arrangement of a communication apparatus of this embodiment.

FIG. 2 is a block diagram showing the arrangement of the communication apparatus according to the present invention.

Referring to FIG. 2, a CPU 2-3 and individual blocks are connected via a system bus 2-1 and an image bus 2-10. A ROM 2-2 is a boot ROM storing a boot program of the system. System software for realizing each means of the present invention is stored in this ROM 2-2 (or a storage memory 2-5) and read out and executed by the CPU 2-3. A RAM 2-4 is a system work memory area for executing software and stores data of a memory box management table for executing a memory box function and data of a conversion table required for format conversion. This RAM 2-4 also functions as an image memory for temporarily storing image data. The storage memory 2-5 stores facsimile coded data, image data, and system software. A LAN (Local Area Network) I/F unit 2-6 is an I/F unit for connecting to the Internet and is connected to the Internet via a device such as a remote router connected to the LAN. A line I/F unit 2-7 is connected to an ISDN or a public services telephone network and controlled by a communication control program in the ROM 2-2. This line I/F unit 2-7 has a function of exchanging data with a remote terminal via an ISDN I/F, a modem, or an NCU (Network Control Unit). An IO control B unit 2-8 interfaces with an operation unit (UI=User Interface) 2-15 and outputs to the operation unit 2-15 image data to be displayed on it. This IO control B unit 2-8 also transmits information input by the user of the system to the CPU 2-3. The IO control B unit 2-8 is an I/F unit with which software controls the operation unit 2-15 including a display device and a keypad device. The above blocks are arranged on the system bus 2-1.

An IO control A unit 2-9 is a bus bridge which connects the system bus 2-1 to the image bus 2-10 for transferring image data at high speed, and converts the data structure of the system bus 2-1. The image bus 2-10 is a PCI bus or IEEE1394. The following blocks are arranged on this image bus 2-10. That is, a reader unit 2-14 and printer unit 2-13 as image I/O devices are connected to a control unit 2-16 to perform synchronous/asynchronous conversion of image data. An image processing unit 2-11 corrects, processes, and edits input and output image data. An image converting unit 2-12 performs rotation, compression/expansion, binary-multilevel conversion, image density conversion, and compression/expansion processes such as JPEG, JBIG, MR, and MMR for image data. Note that the ROM 2-2 stores a process program as a format converting means of the present invention, which converts facsimile image data into a password added image format and forms a password added file.

A password added file is a file formed by adding password data of a predetermined format to image data. A workstation receiving this password added file is requested to input the password when opening the file by predetermined viewer software. The file can be referred to only when the passwords match.

It is also possible to give the image processing unit 2-11 an electronic watermark function and form a password added file by embedding password data as electronic watermark information in image data.

An operation of receiving a secret document will be described below. In this embodiment, a secret document is received as a facsimile image in a memory box by a sub-address signal (to be referred to as an SUB signal hereinafter) of ITU-T recommendation T. 30 and a password signal (PWD signal).

Figure 3:
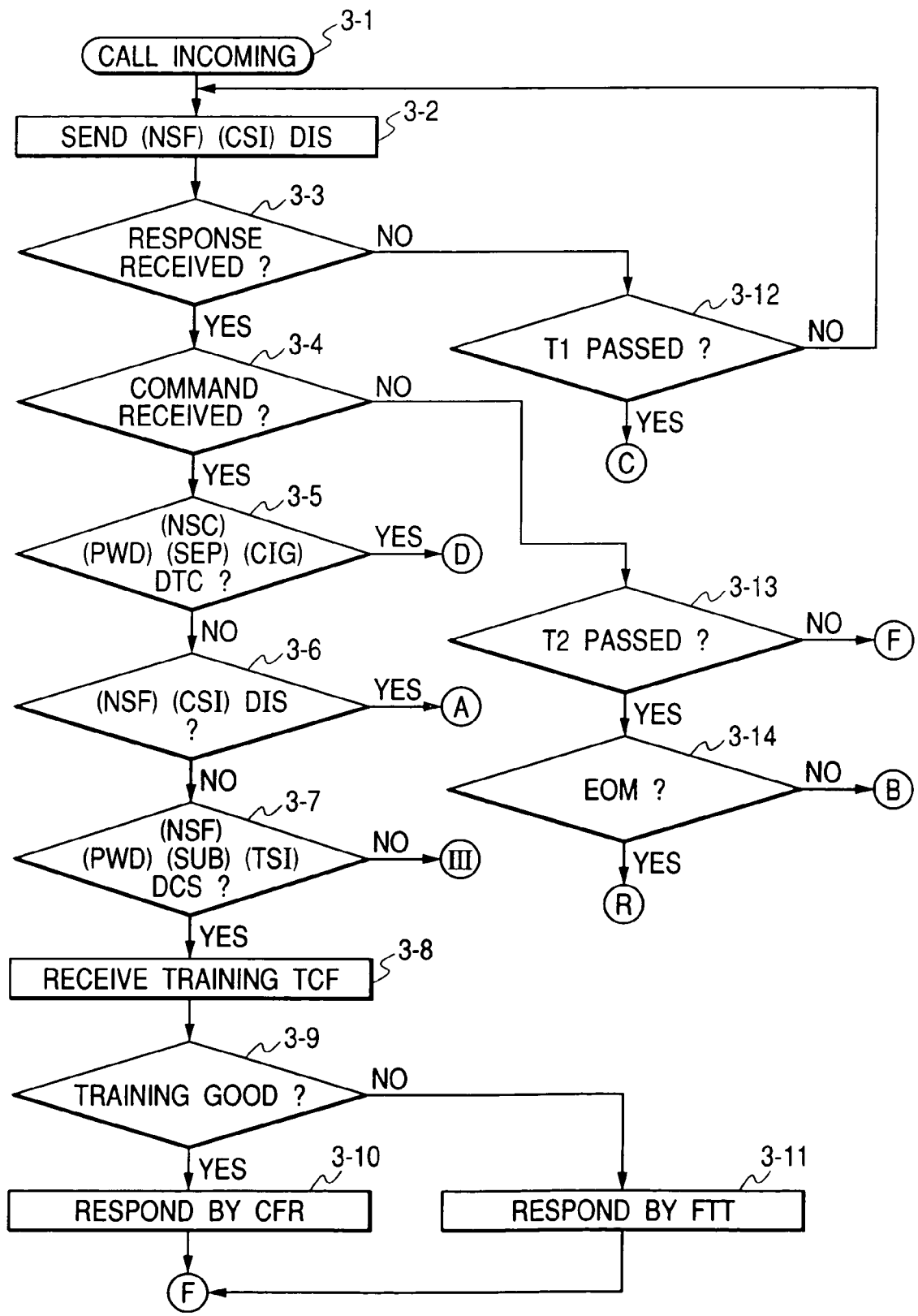
FIG. 3 is a flow chart showing a receiving operation employed by this embodiment and recommended by ITU-T recommendation T. 30.

FIG. 3 is a flow chart showing a pre-procedure in facsimile reception based on ITU-T recommendation T. 30. In FIG. 3, "SUB", "PWD", and "SEP" represent a sub-address frame, a password frame, and a selective polling frame, respectively. Node names (A), (B), (C), (D), (F), (R), and (III) are the same as node names in a flow chart recommended by ITU-T recommendation T. 30. Also, "NSF", "CSI", "DIS", "NSC", "CIG", "DTC", "TSI", "TCF", "CFR", and "FTT" are procedure signals defined by ITU-T recommendation T. 30.

After call incoming (step 3-1), a procedure signal from a transmitter is received (step 3-3) while a DIS signal and the like are sent (step 3-2). This DIS signal declares that a "selective polling function" and a "password function" are available. When a DCS signal and the like are received (step 3-7), the flow advances to step 3-8, and a known facsimile receiving procedure is executed to receive an image. Since a PWD signal and an SUB signal are sent as multiframes together with the DCS signal (step 3-7), these signals are acquired at this timing and used in the subsequent control.

Figure 4:
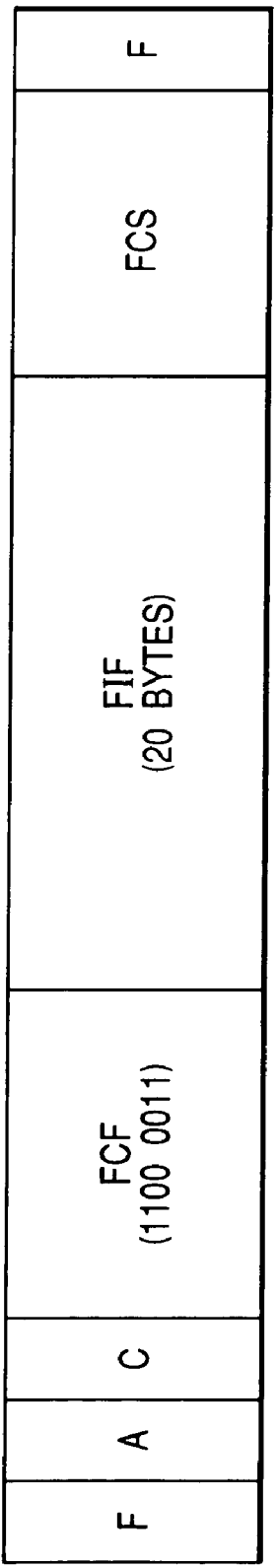
FIG. 4 is a view showing a sub-address frame according to ITU-T recommendation T. 30.

FIG. 4 is a view showing the frame configuration of the SUB signal. An FIF (facsimile information field) of this sub-address stores a 20-byte ASCII code. In this embodiment, this FIF stores information (a memory box number or the like) for specifying an internal memory box of the communication apparatus of the present invention in accordance with a predetermined format.

Figure 5:
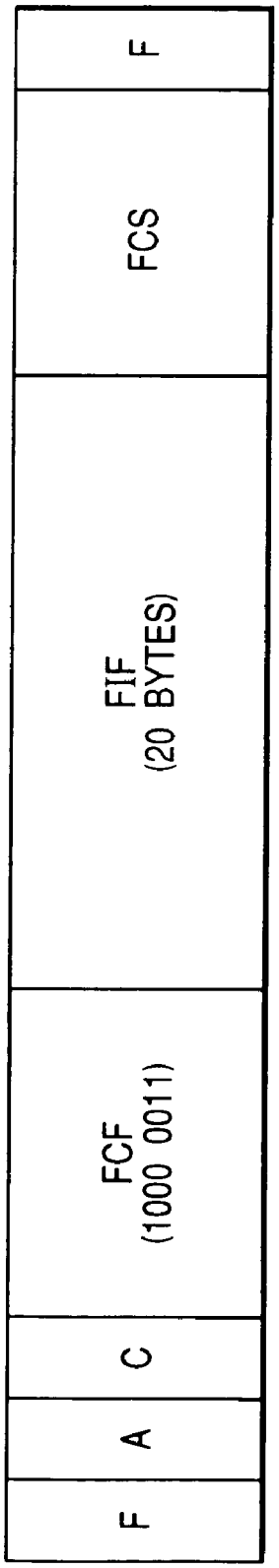
FIG. 5 is a view showing selective polling according to ITU-T recommendation T. 30.

FIG. 5 is a view showing the frame configuration of a selective polling signal (to be referred to as an SEP signal hereinafter). An FIF (facsimile information field) of this selective polling also stores 20-byte ASCII data. In this embodiment, this selective polling FIF stores information for specifying an internal memory box of the communication apparatus of the present invention in accordance with a predetermined format as in the case of the sub-address.

Figure 6:
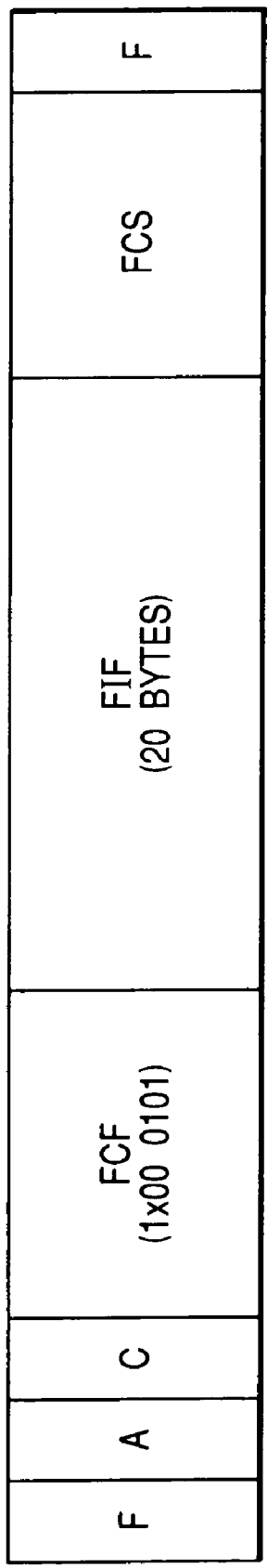
FIG. 6 is a view showing a password frame according to ITU-T recommendation T. 30.

FIG. 6 is a view showing the frame configuration of the PWD signal. An FIF of the password stores password information for classifying a facsimile image in accordance with a predetermined format.

Figure 9:
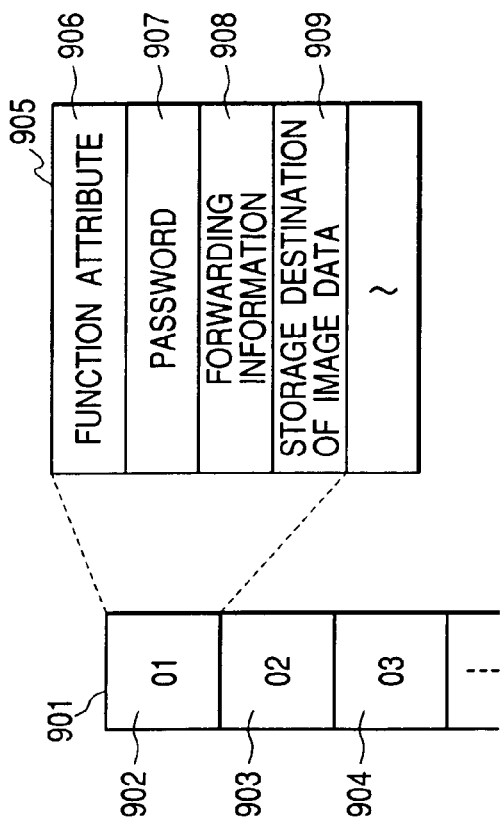
FIG. 9 is a view showing an example of the data structure of a memory box management table for realizing a memory box function.

FIG. 9 is a view showing an example of the data structure of a memory box management table for realizing a memory box function. Referring to FIG. 9, data 902, 903, and 904 for managing box numbers 01, 02, and 03, respectively, are set in a memory box management table 901. In a function attribute 906 of a management data structure 905 of the box 01, attribute information of a target memory box, e.g., "confidential" meaning a secret document or "forwarding" to another apparatus is set. In a password 907, password data acquired from the PWD signal when an image is received is set. This password is preregistered by the operation unit 2-15 and forced to be input when image data in the target memory box is to be read out or erased. Also, password data acquired from the PWD signal when an image is received is set. In a storage destination of image data 909, information indicating the storage destination, in the communication apparatus 1-3, of the received image data is set.

In forwarding information 908, forwarding destination information of the image data is set. More specifically, a forwarding destination type, i.e., an Internet FAX, a common FAX other than an Internet FAX, a terminal device such as a workstation having an e-mail function, or a file server is set. This forwarding destination type is used to check for the ability of a forwarding destination apparatus to receive a secret document. For example, if the type is a common FAX, a document is transmitted as a facsimile image by sub-address/password communication. If the type is a workstation, a document is converted into a password added file and sent as e-mail. Also, as address information of the forwarding destination, the telephone number as the address of a facsimile apparatus or the e-mail address as the address of an e-mail terminal and a file sharing device is set.

Note that if the forwarding destination is undecided, no forwarding destination information need be set in the forwarding information 908.

First Embodiment

In the first embodiment, image data received by sub-address/password communication is forwarded by converting it into a predetermined secret document format.

Figure 7:
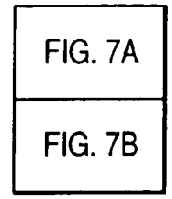
FIG. 7, which is comprised of FIGS. 7A and 7B, is a flow chart showing an operation of processing an image received via a public line.
Figure 7A:
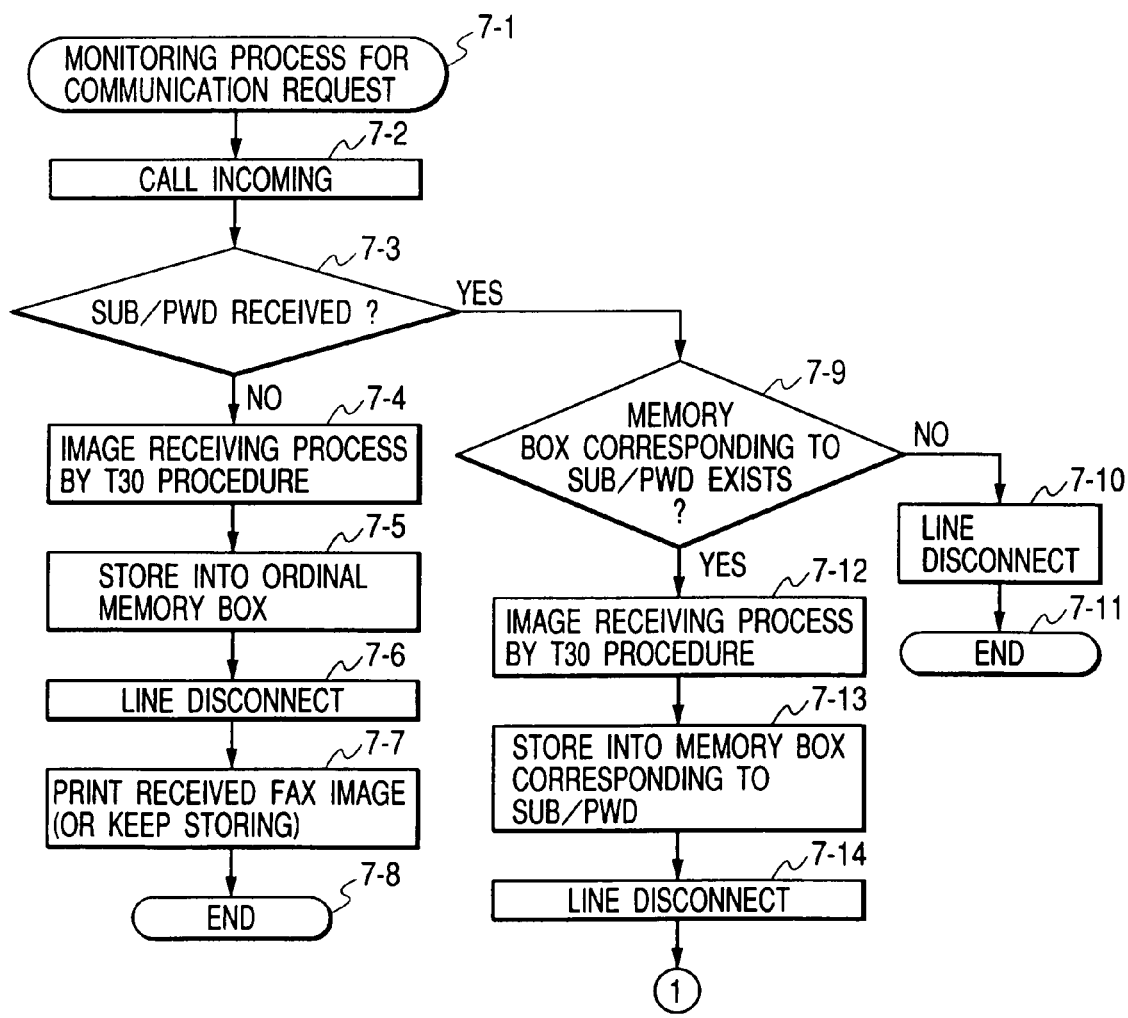
Figure 7B:
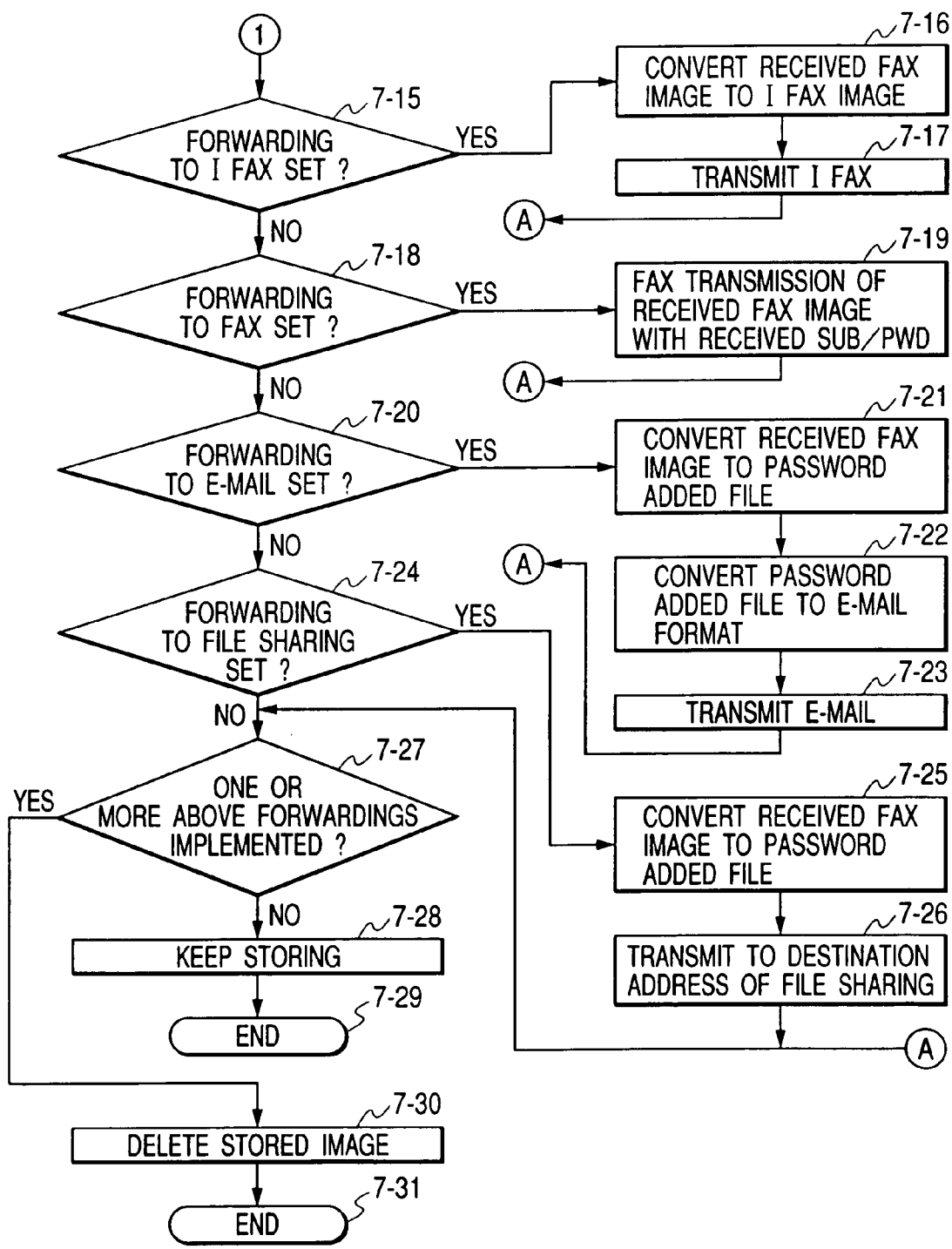

FIGS. 7A and 7B are flow charts showing an operation of processing an image received via the public line 1-7. First, while a communication request such as a originating request or a terminating request is monitored (step 7-1), call incoming is received via the public line 1-2 (step 7-2). When an image is received, whether a sub-address or a password is received from the source station is checked by a pre-procedure (step 7-3).

If neither a sub-address nor a password is received, the image is received in a common memory box (step 7-4/step 7-5). After the reception is completed, the line is disconnected (step 7-6), only one of printing and storage is performed in accordance with the user's setting (step 7-7), and the process is completed (step 7-8).

On the other hand, if a sub-address or a password is received from the source station in step 7-3, the memory box management table 901 is searched to check whether a memory box corresponding to the received sub-address and password exists in the communication apparatus of the present invention (step 7-9). If no corresponding memory box exists, the line is disconnected (step 7-10), and the process is completed (step 7-11).

If a memory box corresponding to the received sub-address and password exists in step 7-9, the image is received in this memory box (step 7-12/step 7-13), and the line is disconnected (step 7-14) after the reception is completed. After that, the memory box management table 901 is checked for preset memory box forwarding setting (step 7-15/step 7-18/step 7-20/step 7-24/step 7-27). The image is forwarded or stored in accordance with the setting contents. If no forwarding is set, the image stored in the memory box is kept stored (step 7-28), and the process is completed (step 7-29).

If forwarding to an Internet FAX (I FAX) is set, the image is converted into an Internet FAX image (step 7-16), and Internet FAX transmission is performed (step 7-17). At present, the Internet FAX standard function has no secrecy (confidentiality) setting. However, control based on a unique procedure for adding the password received in step 7-3 is possible. Also, since the Internet FAX standard function has no secrecy (confidentiality) setting, to maintain the secrecy of data it is possible not to execute forwarding if the forwarding destination is an Internet FAX. Even if forwarding to a common FAX rather than an Internet FAX is set, the image is not converted into a secret document but transmitted as a confidential document to the other FAX by using the sub-address and password received in step 7-3 (step 7-19). If the other FAX apparatus has no confidential receiving function, no data forwarding is performed.

If forwarding to e-mail is set, the image is converted into a document data format (secret document) in which a password can be set (7-21), thereby forming a secret document in which the password received in step 7-3 is set. This secret document is converted into data transmittable by e-mail (step 7-22), and the e-mail is transmitted (step 7-23). This e-mail is transmitted to the terminal device 1-4 via the electronic mail server 1-5 by using, e.g., an STMP/POP protocol. If forwarding to file sharing is set, the image is converted into a secret document in which the received password is set (step 7-25), as in the case of e-mail, and the document is transmitted to the file sharing destination (file server) (step 7-26). FTP or HTTP is an example of the transmission protocol. If even one of the above forwardings is implemented, the stored image in the communication apparatus 1-3 is deleted (step 7-30), and the process is completed (step 7-31).

Figure 16:
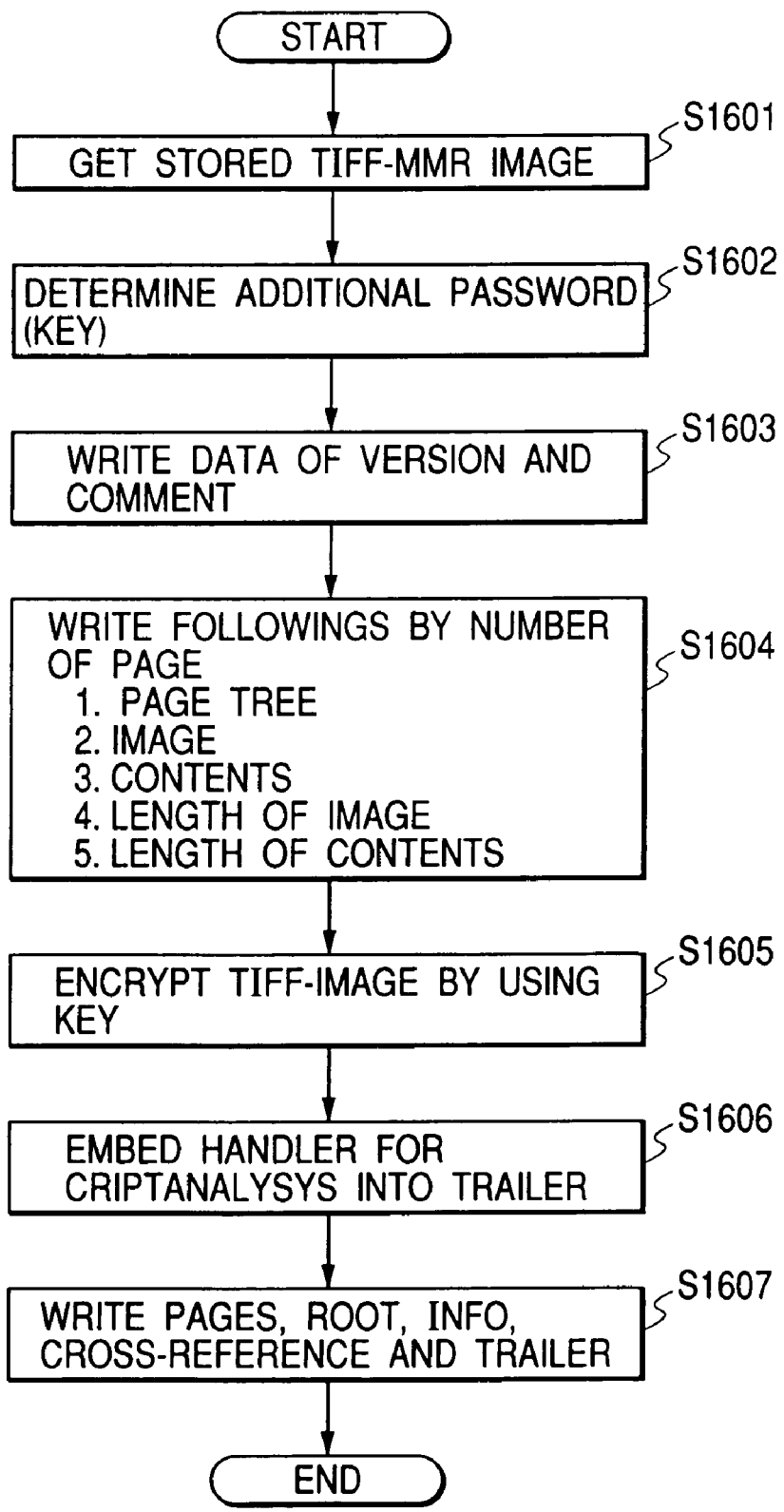
FIG. 16 is a flow chart of conversion to a password added file in the communication apparatus of this embodiment.

An example of the operation of converting into a password added file executed in steps 7-21 and 7-25 will be described below with reference to a flow chart in FIG. 16.

First, in step S1601, information (e.g., storage address) pertaining to the TIFF-MMR image stored in the memory box in step 7-13 of FIG. 7A is acquired.

In step S1602, on the basis of the password received in step 7-3 of FIG. 7A, an encryption key for encrypting the TIFF-MMR image is calculated. This cryptographic algorithm can be stream type encryption such as RC4. However, another cryptographic algorithm having an equivalent effect can also be used.

An area is secured in the storage memory 2-5, and the generated file data is written in the area by the following processing steps.

Note that a password added file used in this embodiment is composed of a header portion, body portion, cross-reference portion, and trailer portion. The body portion stores the text of document data and individual components such as illustrations as objects. In the cross-reference portion, the storage positions of the objects stored in the body portion and the like are set.

In step S1603, version information and the like are written in the header portion of the file.

In step S1604, the body of the image, its attribute information, and the like are written in the body portion.

In step S1605, the TIFF-MMR image is encrypted by using the encryption key determined in step S1602.

In step S1606, a security handler for decrypting the data encrypted in step S1605 by using the encryption key is embedded in the trailer portion of the file.

In step S1607, pieces of information such as the trailer portion and the cross-reference portion to be set in the file are written.

By the above processing steps, the password added file generated in the storage memory 2-5 is appropriately forwarded.

In the first embodiment as described above, before image data received by sub-address/password communication is forwarded, it is converted into a predetermined secret document format. Therefore, the secrecy of the received data can be maintained in the forwarding destination.

Second Embodiment

Figure 8B:
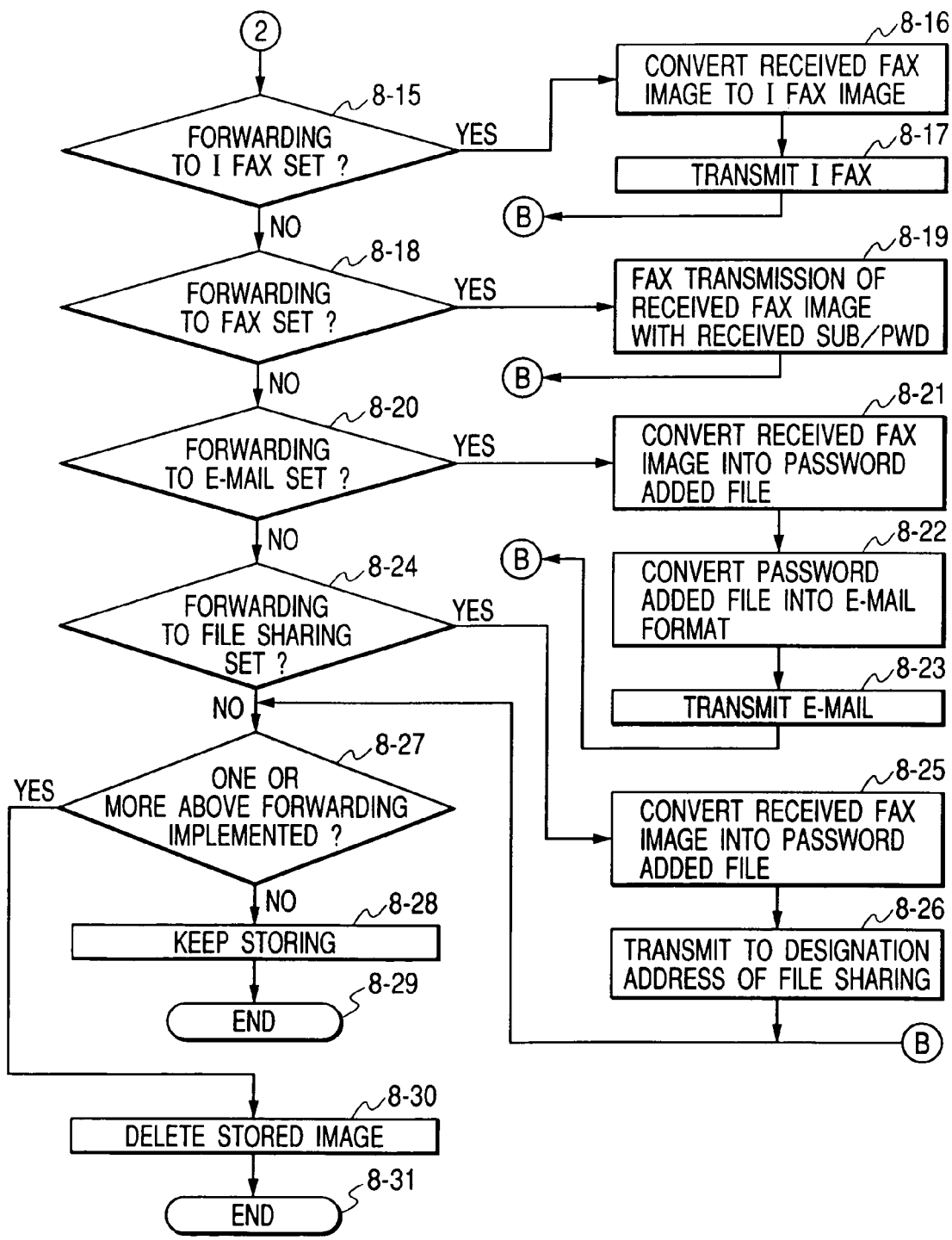
FIG. 8, which is comprised of FIGS. 8A and 8B, is a flow chart showing an operation of performing calling from the communication apparatus and processing an image received by selective polling via a public line 1-7.

In the second embodiment, image data received by polling by selective polling/password communication is forwarded after being converted into a predetermined secret document format. FIGS. 8A and 8B are flow charts showing an operation of performing calling from the communication apparatus 1-3 and processing an image received by selective polling from the facsimile apparatus 1-6 via the public line 1-7. First, if polling reception activation is requested while a communication request such as a originating request or a terminating request is monitored (step 8-1), calling is performed via the public line 1-2 (step 8-2). Whether the user designates selective polling settings (settings of selective polling and a password) when activating polling reception is checked (step 8-3). If neither selective polling nor a password is set or if only selective polling is set, an image is received by polling in an ordinary memory box (step 8-4/step 8-5), and the line is disconnected after the reception is completed (step 8-6). After that, one of printing or storage is performed in accordance with the user's setting (step 8-7), and the process is completed (step 8-8). If the user designates both selective polling and a password, the flow advances from step 8-3 to step 8-9, and selective polling and the password are transmitted to the destination station (step 8-9). If the destination station does not permit selective polling and the password, this destination station disconnects the line (step 8-10), so the process is completed (step 8-11).

If the destination station permits selective polling and the password transmitted, the image is received in the corresponding memory box (step 8-12/step 8-13), and the line is disconnected after the reception is completed (step 8-14). After that, forwarding or storage is performed in accordance with forwarding setting (step 8-15/step 8-18/step 8-20/step 8-24/step 8-27) previously set by the user. If no forwarding is set, the image stored in the memory box is kept stored (step 8-28), and the process is completed (step 8-29). If forwarding to an Internet FAX is set, the image is not converted into a secret document because an Internet FAX has no secrecy (confidentiality) setting. That is, the image is converted into an Internet FAX image (step 8-16) and transmitted by Internet FAX (step 8-17).

At present, the Internet FAX standard function has no secrecy (confidentiality) setting. However, control based on a unique procedure for adding the password received in step 8-9 is possible. Also, since the Internet FAX standard function has no secrecy (confidentiality) setting, to maintain the secrecy of data, it is possible not to execute forwarding if the forwarding destination is an Internet FAX. Even if forwarding to a common FAX rather than an Internet FAX is set, the image is not converted into a secret document but transmitted as a confidential document to the other FAX by using selective polling and the password received in step 8-9 (step 8-19). If forwarding to e-mail is set, the image is converted into a document data format (secret document) in which a password can be set (8-21), thereby forming a secret document in which the transmitted password is set. This secret document is converted into data transmittable by e-mail (step 8-22), and the e-mail is transmitted (step 8-23). If forwarding to file sharing is set, the image is converted into a secret document in which the received password is set (step 8-25), as in the case of e-mail, and the document is transmitted to the file sharing destination (step 8-26). If even one of the above forwardings is implemented, the stored image in the communication apparatus 1-3 is deleted (step 8-30), and the process is completed (step 8-31).

In the second embodiment as described above, before image data received by polling by selective polling/password communication is forwarded, it is converted into a predetermined secret document format. Accordingly, the secrecy of the received data can be maintained in the forwarding destination.

Third Embodiment

The third embodiment will be described next. A communication apparatus of this third embodiment sets a plurality of stages of access modes when converting a received facsimile image into a password added file.

Generally, versatile password added files use a plurality of types of passwords, e.g., a "read password" for permitting only read of a file and inhibiting change or deletion, and a "write password" for permitting read, change, and deletion of a file. For example, when commercially available DTP application software is to save a formed document as a file, it is possible to use a password for permitting only read of that document file or a password which allows settings of the document file.

When converting a received facsimile image into a password added file, the communication apparatus of this third embodiment generates a plurality of types of passwords and embeds them in the file.

Figure 10:
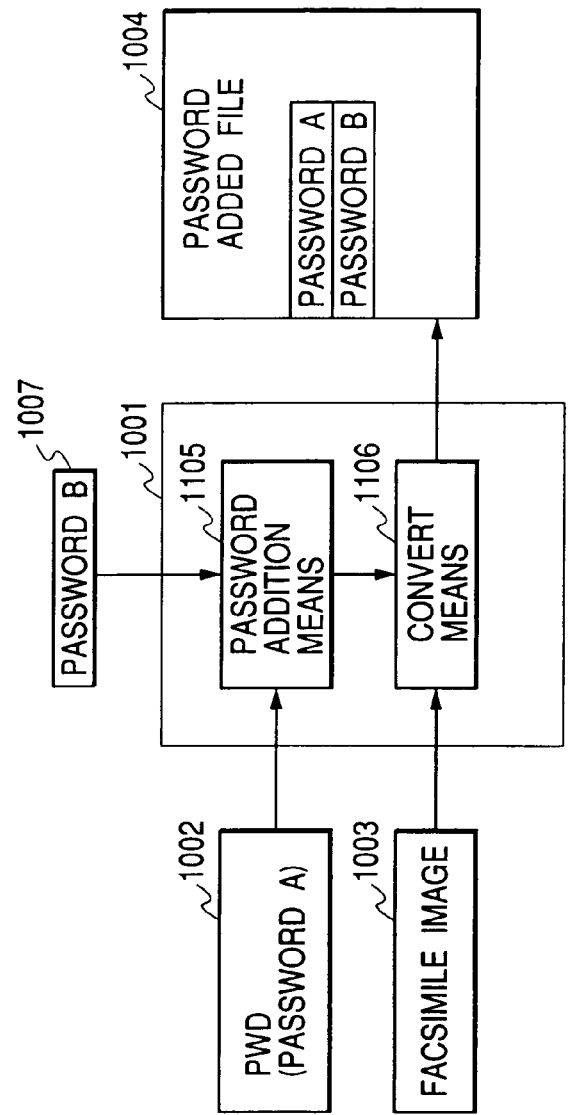
FIG. 10 is a view for explaining the configuration of the third embodiment.
Figure 11:
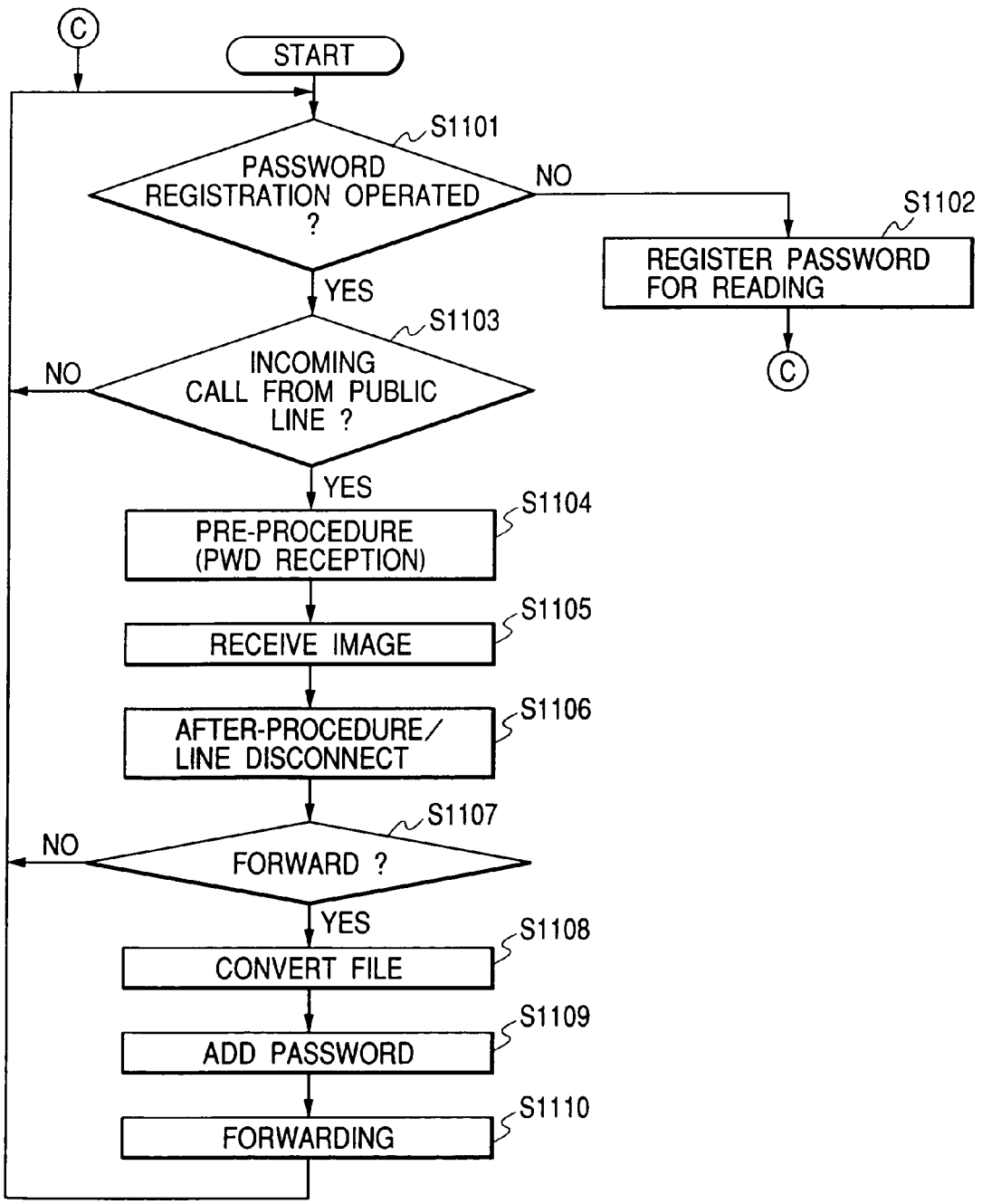
FIG. 11 is a flow chart of the operation of a communication apparatus of the third embodiment.

The operation of the communication apparatus of the third embodiment will be described below with reference to FIGS. 10 and 11. FIG. 10 is a view for explaining the arrangement of the third embodiment. FIG. 11 is a flow chart showing the operation of the communication apparatus of this third embodiment.

First, if it is detected in step S1101 that password registration is operated by the operation unit (2-15 in FIG. 2), the flow advances to step S1102 to register a "password B" 1007 as a read password in the RAM (2-4 in FIG. 2).

If in step S1103 a call incoming from a public line is detected, a pre-procedure is executed (step S1104). Subsequently, a facsimile image 1003 is received (step S1105), an after-procedure is executed, and the line is disconnected (step S1106). In the pre-procedure in step S1104, a "password A" 1002 is acquired from the FIF of a PWD signal received from the destination transmitter.

In step S1107, whether the facsimile image 1003 received in step S1105 is to be forwarded is determined. As in the first embodiment, this determination is done on the basis of the contents of preset forwarding setting of a memory box by checking the memory box management table 901. If the image is not to be forwarded, the image stored in the memory box is kept stored, and the flow advances to step S1101 to return to the wait state.

If the image is to be forwarded, the flow advances to step S1108 to convert the facsimile image 1003 into a password added file of a predetermined format which is data-exchanged on personal computers (corresponding to a convert means 1106 in FIG. 10). The "password B" registered in step S1002 and the "password A" acquired in step S1104 are embedded as a read password and a write password, respectively, in the file (corresponding to a password addition means 1105 in FIG. 10). A password added file 1004 generated by processes in steps S1108 and S1109 is forwarded (the path 1-8 in FIG. 1) to the addressed terminal device (1-4 or 1-9 in FIG. 1) as a forwarding destination on the LAN (1-1 in FIG. 1).

In the above embodiment, a password (to be referred to as a registered password hereinafter) preregistered by the apparatus is used as a read password, and a password (to be referred to as a received password) received by a PWD signal is used as a write password. This is to use the received password as a password having a higher secrecy level than that of the registered password. However, the relationship between these passwords can also be reversed. That is, it is also possible to use the received password as a read password and the registered password as a write password.

In the communication apparatus of the third embodiment as described above, a plurality of stages of secrecy levels can be set in image data to be forwarded by using a password acquired on a communication procedure and a password preregistered in the apparatus.

Fourth Embodiment

The fourth embodiment will be described next. A communication apparatus of this fourth embodiment has a means for acquiring a plurality of types of passwords during a communication procedure for receiving a facsimile image. When converting a facsimile image into a password added file, the apparatus sets a plurality of stages of access modes for the file by using the acquired different types of passwords.

Figure 13:
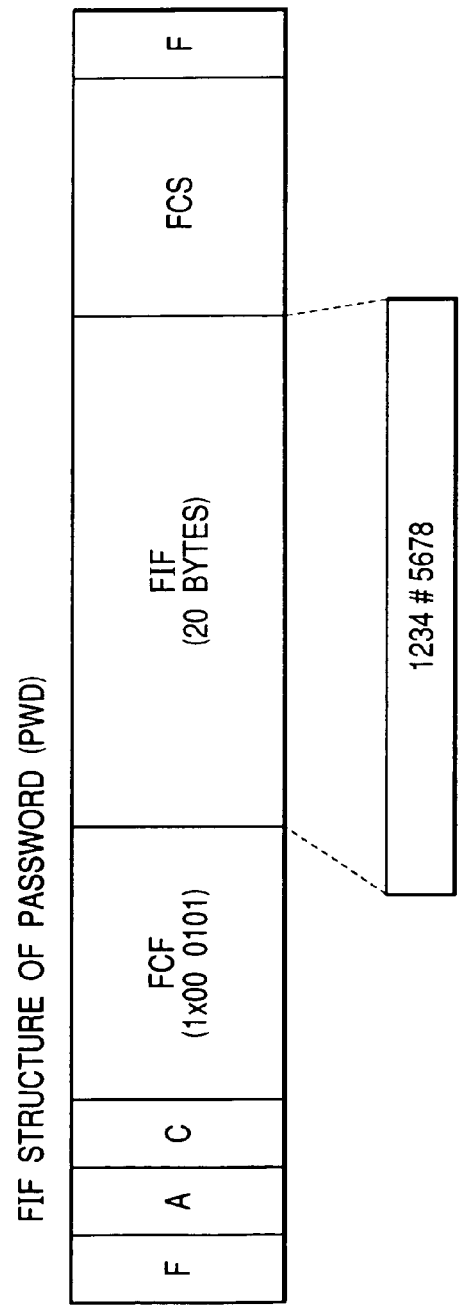
FIG. 13 is a view showing the frame configuration of a PWD signal in the fourth embodiment.

First, the means for acquiring a plurality of types of passwords during a communication procedure will be described with reference to FIG. 13. FIG. 13 is a view showing the frame configuration of a PWD signal. In an information field FIF, a first password "1234" and a second password "5678" are set together with a delimiter "#". The communication apparatus of this fourth embodiment analyzes the FIF of a PWD signal acquired during image reception, sequentially reads out the numerical data delimited by the delimiter "#", and uses them as passwords. That is, the apparatus uses a password ("1234" in FIG. 13) read out first from the leading position of the FIF as a read password, and a password ("5678" in FIG. 13) read out next as a write password.

Note that it is naturally possible to use the password read out first as a write password. Note also that a predetermined symbol (e.g., "*") can be added to the numerical data in the FIF to identify the type of password. As an example, when data in the FIF is "*1234#5678", "1234" having the identification symbol "*" attached can be used as a read password.

In the above method, a plurality of types of passwords can be acquired by directly using the procedure of ITU-T recommendation T. 30. This obviates the need to, e.g., add a new procedure signal.

Figure 12:
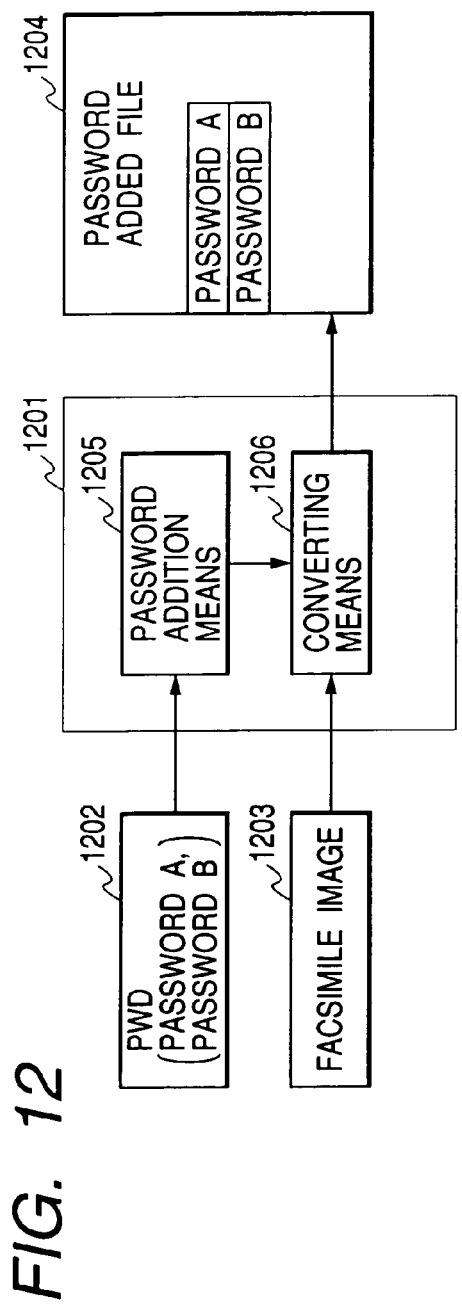
FIG. 12 is a view for explaining the configuration of the fourth embodiment.
Figure 14:
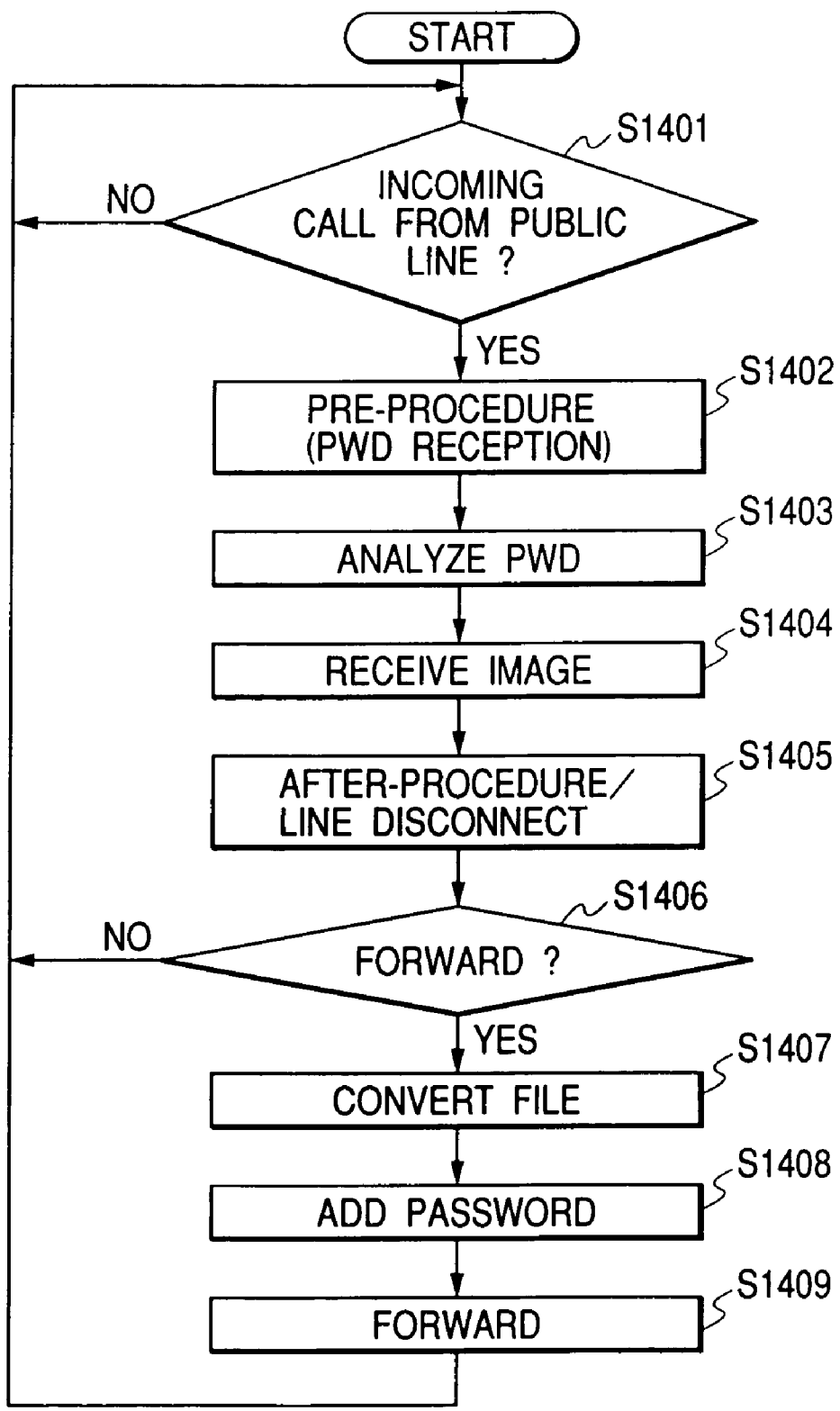
FIG. 14 is a flow chart showing the operation of a communication apparatus of the fourth embodiment.

The operation of the communication apparatus of this fourth embodiment will be described below with reference to FIGS. 12 and 14. FIG. 12 is a view for explaining the arrangement of the fourth embodiment. FIG. 14 is a flow chart showing the operation of the communication apparatus of the fourth embodiment.

First, if in step S1401 a call incoming from a public line is detected, a pre-procedure is executed (step S1402), and the contents of the FIF of a PWD signal are analyzed to acquire a plurality of types of passwords (step S1403). From the acquired passwords, a plurality of passwords are extracted on the basis of the method explained with reference to FIG. 13, and whether each password is a read password or a write password is determined. Assume that a "password A" is extracted as a read password and a "password B" is extracted as a write password.

Subsequently, a facsimile image 1203 is received (step S1404), an after-procedure is executed, and the line is disconnected (step S1405). In step S1406, whether the facsimile image 1203 received in step S1404 is to be forwarded is determined. As in the first embodiment described earlier, this determination is done on the basis of the contents of preset forwarding setting of a memory box by checking the memory box management table 901. If the image is not to be forwarded, the image stored in the memory box is kept stored, and the flow advances to step S1401 to return to the wait state.

If the image is to be forwarded, the flow advances to step S1407 to convert the facsimile image 1203 into a password added file of a predetermined format which is data-exchanged on personal computers (corresponding to a converting means 1206 in FIG. 12). The "password A" and the "password B" acquired in step S1403 are embedded as a read password and a write password, respectively, in the file (corresponding to a password addition means 1205 in FIG. 12). A password added file 1204 generated by processes in steps S1408 and S1409 is forwarded (the path 1-8 in FIG. 1) to the addressed terminal device (1-4 or 1-9 in FIG. 1) as a forwarding destination on the LAN (1-1 in FIG. 1).

In the communication apparatus of the fourth embodiment as described above, a plurality of stages of secrecy levels can be set in image data to be forwarded by using a plurality of types of passwords acquired on a communication procedure and devices. In particular, the effect that the above third embodiment does not have is to allow the destination transmitter (1-6 in FIG. 1) to control a plurality of stages of secrecy levels to be set in a file.

Fifth Embodiment

The fifth embodiment will be described below. In each of the first to fourth embodiments described above, when forwarding is set for a received facsimile image, the received facsimile image is converted into a password added file.

In a communication apparatus of this fifth embodiment, even when no forwarding is set for a received facsimile image, the received facsimile image is converted into a password added file and stored in a memory box designated by a sub-address.

Consequently, the secrecy of a received image can be maintained when a received image in a memory box is forwarded in accordance with a transmission request from the terminal device 1-4 on the LAN 1-1 or when a received image in a memory box is forwarded to the terminal device 1-4 on the LAN 1-1 by an operation from the communication apparatus.

The fifth embodiment will be described below with reference to FIGS. 15A and 15B.

Figure 15B:
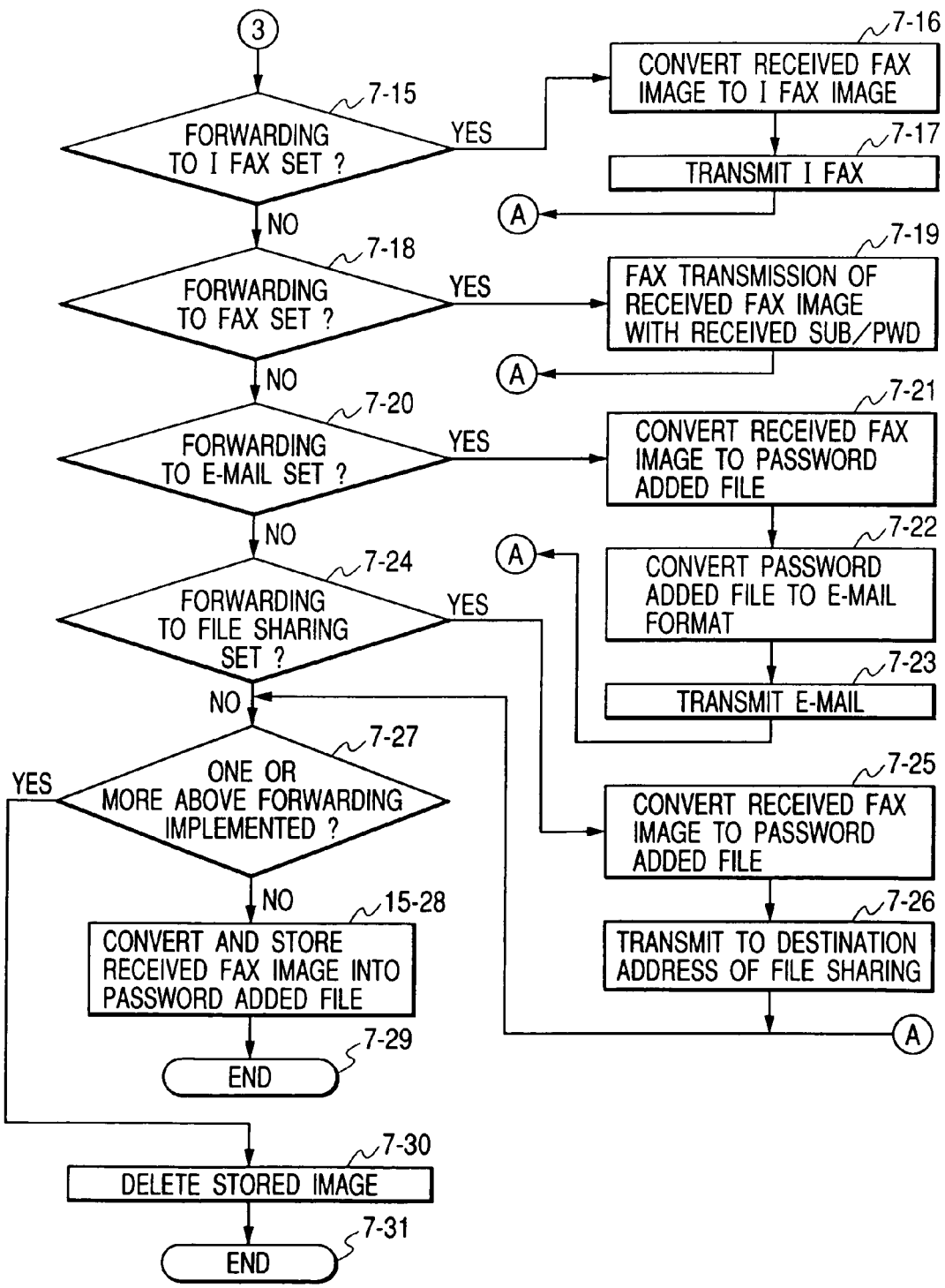
FIG. 15, which is comprised of FIGS. 15A and 15B, is a flow chart showing the operation of a communication apparatus of the fifth embodiment.

FIGS. 15A and 15B are flow charts showing the operation of the communication apparatus of the fifth embodiment. In these flow charts, the process in step 7-28 of the operation flow chart shown in FIG. 7B is changed to step 15-28.

After a received image from a public line is stored in a memory box, in step 7-27 whether forwarding is set for the memory box storing the received image in step 7-13 is determined by checking the memory box management table 901. If no forwarding is set, the flow advances to step 15-28.

In step 15-28, the received image stored in the memory box in step 7-13 is converted into a password added file to which a password received in step 7-3 is added, and the file is kept stored.

After that, the received image in the memory box can be forwarded as the password added file in accordance with a forwarding request from the terminal device 1-4 on the LAN 1-1 or can be forwarded as the password added file to the terminal device 1-4 on the LAN 1-1 by a forwarding operation from the communication apparatus.

Since the forwarding request from the terminal device 1-4 designates a memory box, a password added file stored in the designated memory box is forwarded to the terminal device 1-4. When forwarding is operated from the communication apparatus, a memory box and an addressed terminal device on the LAN 1-1 are designated from the operation unit 2-15. Hence, a password added file stored in the designated memory box is forwarded to the terminal device 1-4.

As described above, the communication apparatus of the fifth embodiment can extract a facsimile image from an arbitrary terminal device on a network while maintaining the secrecy of the image.

Sixth Embodiment

The sixth embodiment relates to the communication apparatus 1-6 as a transmission source for transmitting an image to the communication apparatus 1-3 according to the fourth embodiment. This sixth embodiment is characterized in that a plurality of types of passwords entered when an image is transmitted are set in a predetermined frame of a communication procedure and notified to the communication apparatus 1-3.

The arrangement of the communication apparatus 1-6 is identical with the communication apparatus 1-3 shown in FIG. 2.

The operation of the communication apparatus of this sixth embodiment will be described below with reference to the accompanying drawings.

Figure 18:
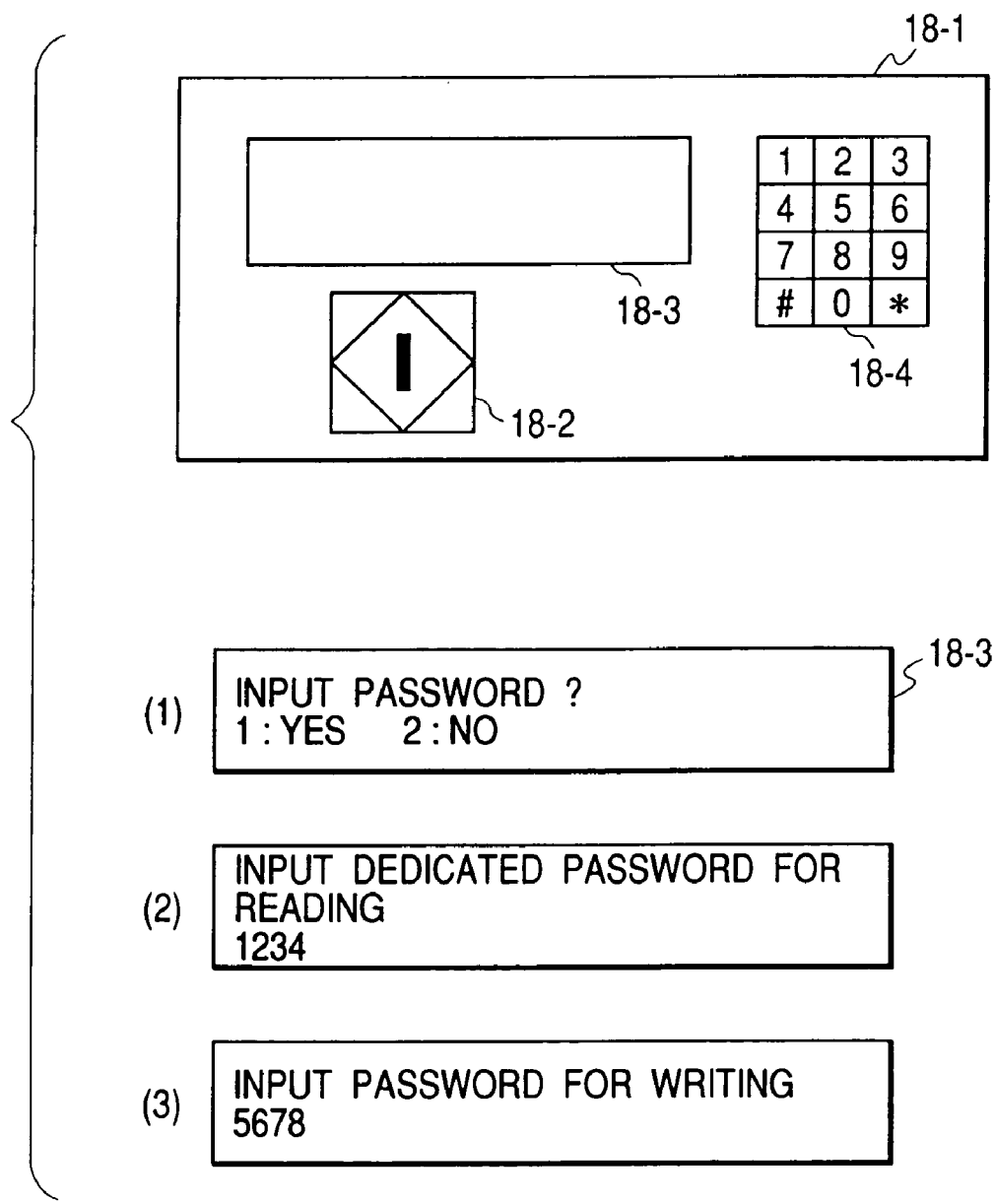
FIG. 18 is a view showing a user interface of the transmitting-side communication apparatus of this embodiment.

FIG. 18 is a view showing the arrangement of the operation unit 2-15 and examples of displayed messages.

The communication apparatus 1-6 has an operation panel 18-1. A start button 18-2 is a key button for inputting a facsimile transmission instruction. An LCD (Liquid Crystal Display) 18-3 is a display means for displaying messages during operation. A ten-key pad 18-4 is an input means for inputting the telephone number of a facsimile transmission destination and inputting an instruction for each operation.

Figure 17:
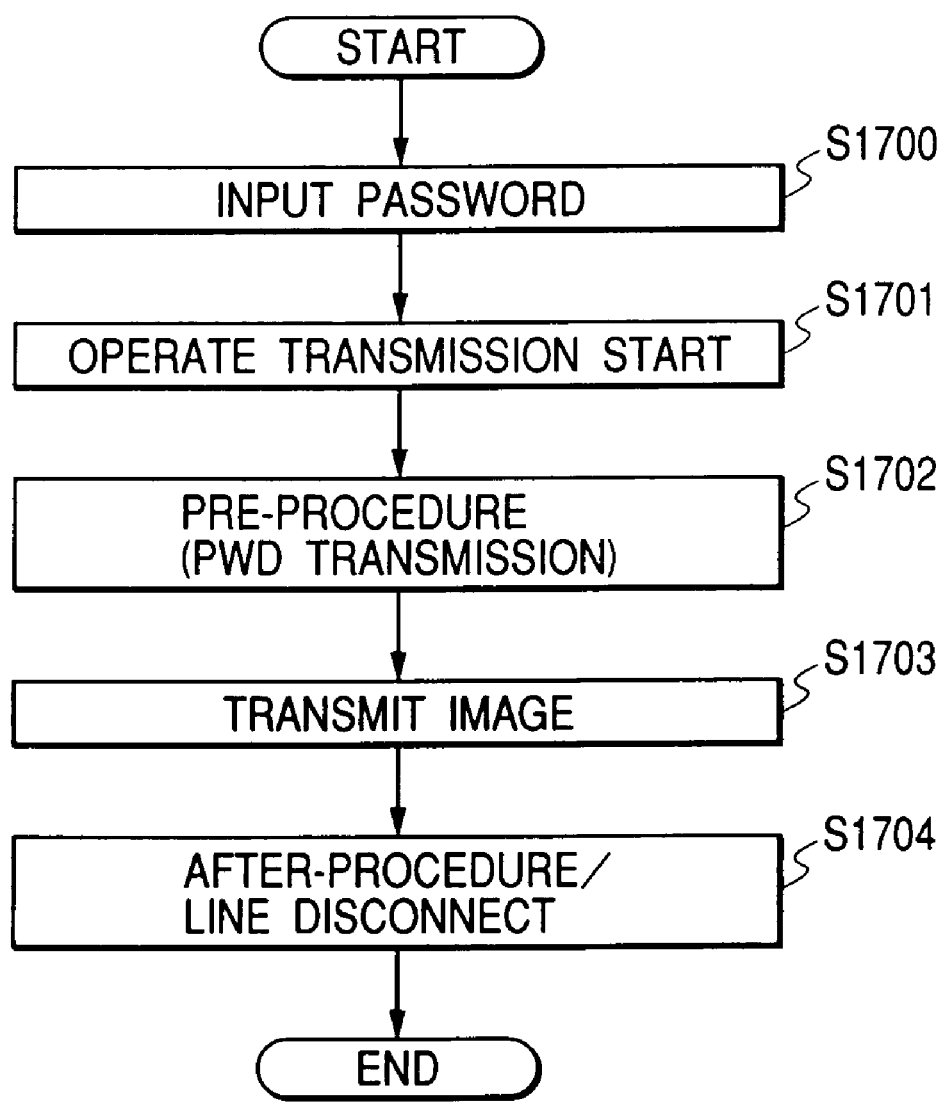
FIG. 17 is a flow chart of the operation of a transmitting-side communication apparatus of this embodiment.

The operation of the transmitting-side communication apparatus of this sixth embodiment will be described below with reference to a flow chart in FIG. 17.

In step S1700, a user inputs passwords corresponding to transmission data in accordance with messages, indicated by (1) to (3) in FIG. 18, displayed on the LCD 18-3. In this embodiment, the user inputs "1234" and "5678" as a read password and a write password, respectively.

In step S1701, the user inputs the destination telephone number of the communication apparatus 1-3 by using the ten-key pad 18-4 on the operation panel 18-1 and presses the start button 18-2 to activate an image transmission operation.

Note that an image to be transmitted can be an image obtained by reading an original by the reader unit 2-14 or an image prestored in the memory 2-5.

When the image transmission operation is activated, the input destination telephone number is dialed to connect to the communication apparatus 1-3, and a communication procedure from step S1702 is started.

In a pre-procedure in step S1702, the read password "1234" and the write password "5678" are set together with a delimiter "#" in an information field FIF of a PWD signal shown in FIG. 13. In this embodiment, the password ("1234" in FIG. 13) set first from the leading position of the FIF is used as a read password, and the password ("5678" in FIG. 13) set next is used as a write password. Note that it is naturally possible to use the password set first as a write password. Note also that a predetermined symbol (e.g., "*") can be added to the numerical data in the FIF to identify the type of password. As an example, when data in the FIF is "*1234#5678", "1234" having the identification symbol "*" attached can be used as a read password.

In the above method, a plurality of types of passwords can be acquired by directly using the procedure of ITU-T recommendation T. 30. This eliminates the need to, e.g., add a new procedure signal.

Subsequently, a facsimile image 1203 is transmitted (step S1703), an after-procedure is executed, and the line is disconnected (step S1704).

By the above operation, the communication apparatus 1-3 is informed of a plurality of passwords input by the operation shown in FIG. 18 together with image transmission.

After that, the communication apparatus 1-3 sets a plurality of stages of secrecy levels in the received image by the operation explained in the fourth embodiment and forwards the image.

As described above, the communication apparatus of the sixth embodiment can inform the transmission destination of a plurality of pieces of password information corresponding to a transmission image when transmitting the image.

In each of the third to sixth embodiments, password types are a "write password" and a "read password". However, it is also possible to set passwords having different security levels, such as an "owner password" and a "user password", on the basis of management authorization. For example, when an owner password is supplied to a document file, all accesses such as change, erasure, and read to that document file are permitted. On the other hand, when a user password is supplied to a document file, only read access to that document file is permitted.

In each of the above embodiments, an operation example of one apparatus which is a communication apparatus is explained. However, the object of the present invention is also achieved by an integrated system obtained by connecting a plurality of apparatuses (e.g., a scanner, printer, personal computer, and modem) by a predetermined interface.

Furthermore, the communication apparatuses (1-3 and 1-6) according to the present invention can be constituted by computers.

Figure 19:
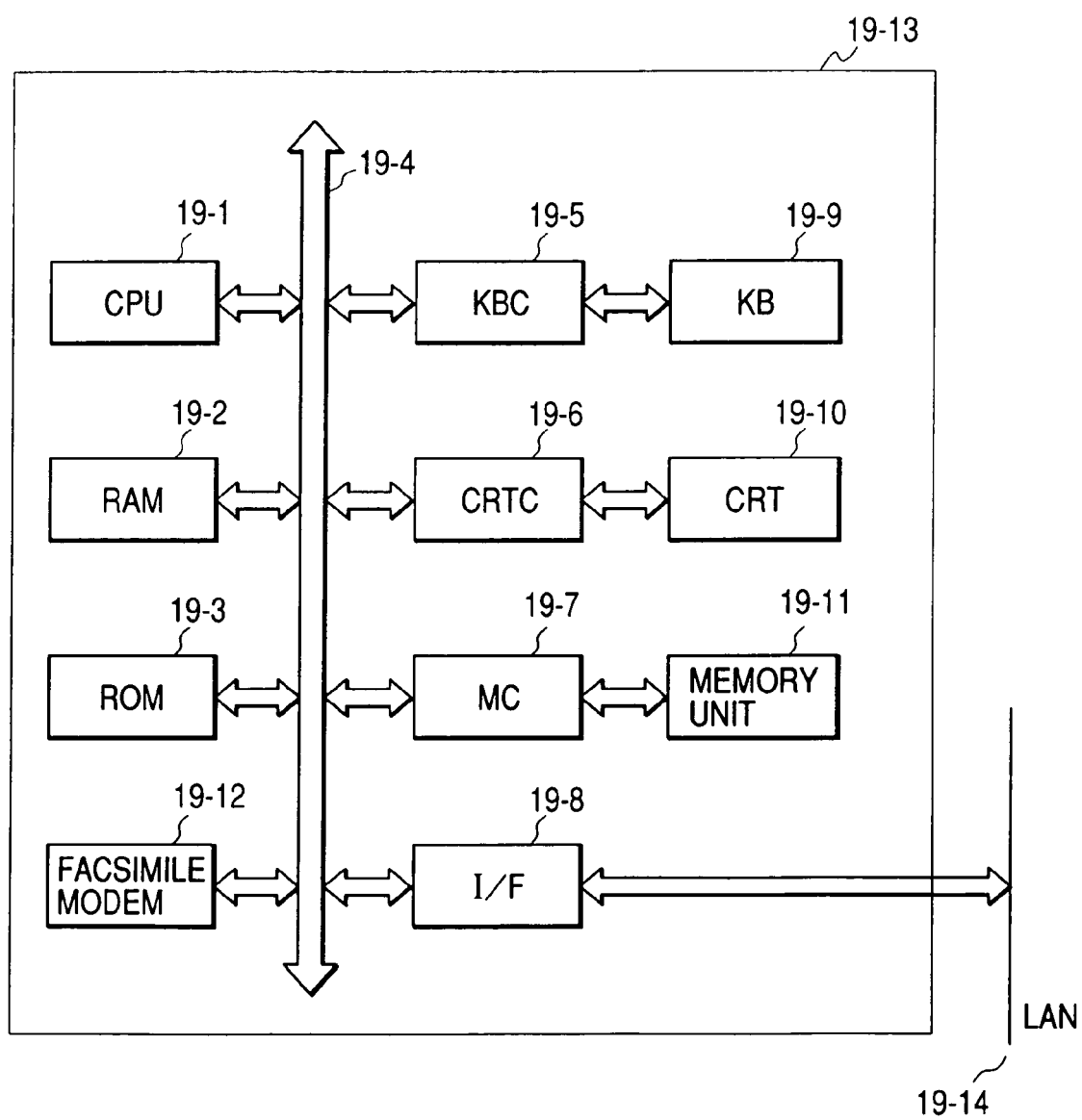
FIG. 19 is a block diagram when the communication apparatus of this embodiment is implemented by a PC.

For example, the communication apparatus (1-6) can be realized by a PC (Personal Computer) including a modem as shown in FIG. 19. Referring to FIG. 19, a PC (Personal Computer) 19-3 connects to a LAN 19-14 via an I/F 19-8. A plurality of terminal devices (e.g., workstations or PCs), a printer, and the like are connected to the LAN 19-14. Also, this LAN 19-14 connects to a public line via a facsimile modem 19-12 to exchange facsimile data with the line.

A RAM 19-2 stores programs to be executed by a CPU (Central Processing Unit) 19-1. A ROM 19-3 also stores programs. When an operator operates a keyboard 19-9, the CPU 19-1 reads out data input via a keyboard controller 19-5. When the UI shown in FIG. 18 is to be displayed by a known GUI (Graphical User Interface) or the like, image data is supplied to a CRT controller 19-6, and a video signal corresponding to the image data is supplied to and displayed on a CRT 19-10.

A memory unit 19-11 stores programs and data as files. This memory unit 19-11 can be a fixed hard disk or a memory unit having a removable medium, such as a removable hard disk, a flexible disk, an optical disk, or a magnetooptical disk. Data is read out from and written in the memory unit 19-11 via a memory controller 19-7. These blocks are connected by a system bus 19-4.

Likewise, the communication apparatus (1-3) can be realized by a PC (FIG. 19). In this case, the memory unit 19-1 stores facsimile coded data, image data received from the communication apparatus 1-6, and system software. The facsimile modem 19-12 can also be the line I/F unit (2-7). The image processing unit (2-11) and the image converting unit (2-12) are also necessary.

Further, the present invention is naturally applicable to a case in which the programs for realizing the above embodiments, stored in the ROM 2-2 shown in FIG. 2, are supplied to a system or an apparatus by various storage media.

In this case, the object of the present invention can also be achieved by storing program codes of software for performing the functions of the above embodiments in a storage medium and reading out and executing the program codes stored in the storage medium by a computer (or a CPU or MPU) of a system or an apparatus. When this is the case, the program codes themselves read out from the storage medium realize the functions of the above embodiments, so the storage medium storing the program codes constitutes the present invention.

As this storage medium for supplying the program codes, it is possible to use, e.g., a floppy disk, a hard disk, an optical disk, a magnetooptical disk, a CD-ROM, a magnetic tape, a nonvolatile memory card, or a ROM.

Furthermore, besides the functions of the above embodiments are realized by executing the readout program codes by a computer, an OS (Operating System) running on the computer can also execute a part of the processing via API or the like on the basis of instructions by the program codes.

Furthermore, the present invention also includes a case where, after the program codes read out from the storage medium are written in a memory of a function extension board inserted into a computer or of a function extension unit connected to a computer, a CPU or the like of the function extension board or function extension unit performs a part or the whole of the processing on the basis of instructions by the program codes and thereby realizes the functions of the above embodiments.

The program codes can be MPU native codes or codes described in a predetermined interpreter language and converted into MPU native codes during run time. The program codes can also be script data described in a predetermined format and interpreted and executed by an operating system.

What is claimed is:

1. A communication apparatus for transmitting received data and first authentication information to a forwarding destination apparatus, said communication apparatus comprising:

acquiring means for acquiring data and first authentication information pertaining to the data;

determining means for determining a type of reception function of the forwarding destination apparatus;

converting means for converting the data and the first authentication information in accordance with a result of the determination by said determining means; and transmitting means for transmitting the converted data and the converted first authentication information, to the forwarding destination apparatus, wherein the transmitted data can be used when second authentication information inputted to the forwarding destination apparatus coincides with the first authentication information, and wherein, if the determination by said determining means is that the forwarding destination apparatus has an e-mail function, said converting means converts the received data into a file of a predetermined format and adds the first authentication information to the file.

2. An apparatus according to claim 1, wherein said acquiring means acquires the first authentication information from a password signal received together with a sub-address signal.

3. An apparatus according to claim 1, wherein said apparatus is a communication apparatus for transmitting data received by polling to the forwarding destination apparatus, and wherein said acquiring means acquires the first authentication information from a password signal to be transmitted together with a selective polling signal.

4. An apparatus according to claim 1, wherein, if the determination by said determining means is that the forwarding destination apparatus has a facsimile function, said converting means adds the first authentication information in a password signal to be transmitted together with a sub-address signal.

5. An apparatus according to claim 1, wherein said apparatus is a communication apparatus for transmitting data received with a designation of a memory box to a forwarding destination apparatus preset in the designated memory box, and further comprises:

registering means for registering the authentication information in a memory box; and comparing means for comparing the first authentication information acquired by said acquiring means with the authentication information registered in the designated memory box and only executes transmission when the two pieces of information match.

6. A communication method of transmitting received data and first authentication information to a forwarding destination apparatus, said communication method comprising:

an acquisition step, of acquiring data and first authentication information pertaining to the data;

a determination step, of determining a type of reception function of the forwarding destination apparatus;

a converting step, of converting the data and the first authentication information in accordance with a result of the determination performed in said determination step; and a transmission step, of transmitting the converted data and the converted first authentication information to the forwarding destination apparatus, wherein the transmitted data can be used when second authentication information inputted to the forwarding destination apparatus coincides with the first authentication information, and wherein, if the determination result from said determination step is that the forwarding destination apparatus has an e-mail function, said converting step includes converting the received data into a file of a predetermined format and adding the first destination information to the file.

7. A method according to claim 6, wherein said acquisition step includes acquiring the first authentication information from a password signal received together with a sub-address signal.

8. A method according to claim 6, wherein said method is a communication method for transmitting data received by polling to a forwarding destination apparatus, and wherein said acquisition step acquires the first authentication information from a password signal to be transmitted together with a selective polling signal.

9. A method according to claim 6, wherein, if the determination result from said determination step is that the forwarding destination apparatus has a facsimile function, said converting step includes adding the first authentication information in a password signal to be transmitted together with a sub-address signal.

10. A method according to claim 6, wherein said method is a communication method for transmitting data received with a designation of a memory box to a forwarding destination apparatus preset in the designated memory box, and further comprises:

a registration step, of registering the authentication information in a memory box; and a comparison step, of comparing the first authentication information acquired in said acquisition step with the authentication information registered in the designated memory box and only executing transmission when the two pieces of information match.

11. A computer-readable medium storing a computer program executable by a processor for transmitting received data and first authentication information to a forwarding destination apparatus, said program comprising:

code for an acquisition step, of acquiring data and first authentication information pertaining to the data;

code for a determination step, of determining a type of reception function of the forwarding destination apparatus;

code for a conversion step, of converting the data in accordance with a result of the determination performed by said code for a determination step; and code for a transmitting step, of transmitting the converted data with the added first authentication information to the forwarding destination apparatus, wherein the transmitted data can be used when second authentication information inputted to the forwarding destination apparatus coincides with the first authentication information, and wherein, if the determination by said code for the determining step is that the forwarding destination apparatus has an email function, said code for the converting step converts the received data into a file of a predetermined format and adds the first authentication information to the file.

* * * * *

UNITED STATES PATENT AND TRADEMARK OFFICE
CERTIFICATE OF CORRECTION

PATENT NO.        : 7,095,830 B1                                    Page 1 of 1
APPLICATION NO. : 09/604407
DATED             : August 22, 2006
INVENTOR(S)       : Jun Hamaguchi It is certified that error appears in the above-identified patent and that said Letters Patent is hereby corrected as shown below:

<u>ON TITLE PAGE AT ITEM (56) FOREIGN PATENT DOCUMENTS</u>

"63151140 A" should read --63-151140 A--.

Signed and Sealed this

Twenty-ninth Day of May, 2007

JON W. DUDAS
*Director of the United States Patent and Trademark Office*